(12) United States Patent
Nakanishi et al.

(10) Patent No.: US 10,481,465 B2
(45) Date of Patent: Nov. 19, 2019

(54) ILLUMINATION DEVICE AND DISPLAY DEVICE

(71) Applicant: Japan Display Inc., Minato-ku (JP)

(72) Inventors: Takayuki Nakanishi, Tokyo (JP); Tatsuya Yata, Tokyo (JP); Takeo Koito, Tokyo (JP)

(73) Assignee: Japan Display Inc., Minato-ku (JP)

( * ) Notice: Subject to any disclaimer, the term of this patent is extended or adjusted under 35 U.S.C. 154(b) by 0 days.

(21) Appl. No.: 15/923,049

(22) Filed: Mar. 16, 2018

(65) Prior Publication Data
US 2018/0275483 A1 Sep. 27, 2018

(30) Foreign Application Priority Data

Mar. 23, 2017 (JP) ................. 2017-057863

(51) Int. Cl.
*G02F 1/29* (2006.01)
*G02F 1/1343* (2006.01)
*G02F 1/1347* (2006.01)
*G02F 1/1335* (2006.01)

(52) U.S. Cl.
CPC ............ *G02F 1/29* (2013.01); *G02F 1/1347* (2013.01); *G02F 1/13471* (2013.01); *G02F 1/134309* (2013.01); *G02F 1/134363* (2013.01); *G02F 1/13362* (2013.01); *G02F 2001/294* (2013.01)

(58) Field of Classification Search
CPC .. G02F 1/29; G02F 1/13471; G02F 1/134363; G02F 1/1347; G02F 1/134309; G02F 2001/294; G02F 1/13362
See application file for complete search history.

(56) References Cited

U.S. PATENT DOCUMENTS

| | | |
|---|---|---|
| 2005/0243237 A1 | 11/2005 | Sasuga |
| 2006/0098296 A1 | 5/2006 | Woodgate et al. |
| 2006/0152812 A1 | 7/2006 | Woodgate et al. |
| 2006/0164593 A1 | 7/2006 | Peyghambarian et al. |
| 2012/0154270 A1* | 6/2012 | Numao ................. H04N 5/72 345/156 |
| 2018/0173056 A1* | 6/2018 | Lin ........................ G02F 1/29 |

FOREIGN PATENT DOCUMENTS

| | | |
|---|---|---|
| JP | 2005-317879 | 11/2005 |
| JP | 2006-516753 | 7/2006 |
| JP | 2007-264321 | 10/2007 |
| JP | 2007-535686 | 12/2007 |
| JP | 2008-529064 | 7/2008 |

* cited by examiner

*Primary Examiner* — Phu Vu
(74) *Attorney, Agent, or Firm* — Oblon, McClelland, Maier & Neustadt, L.L.P.

(57) ABSTRACT

According to one embodiment, an illumination device includes a light source unit which emits light, a modulation element includes a modulation portion which modulates incident light, and a non-modulation portion which is adjacent to the modulation portion, and a liquid crystal element located between the light source unit and the modulation element, the liquid crystal element forming a lens between the light source unit and the modulation portion.

15 Claims, 14 Drawing Sheets

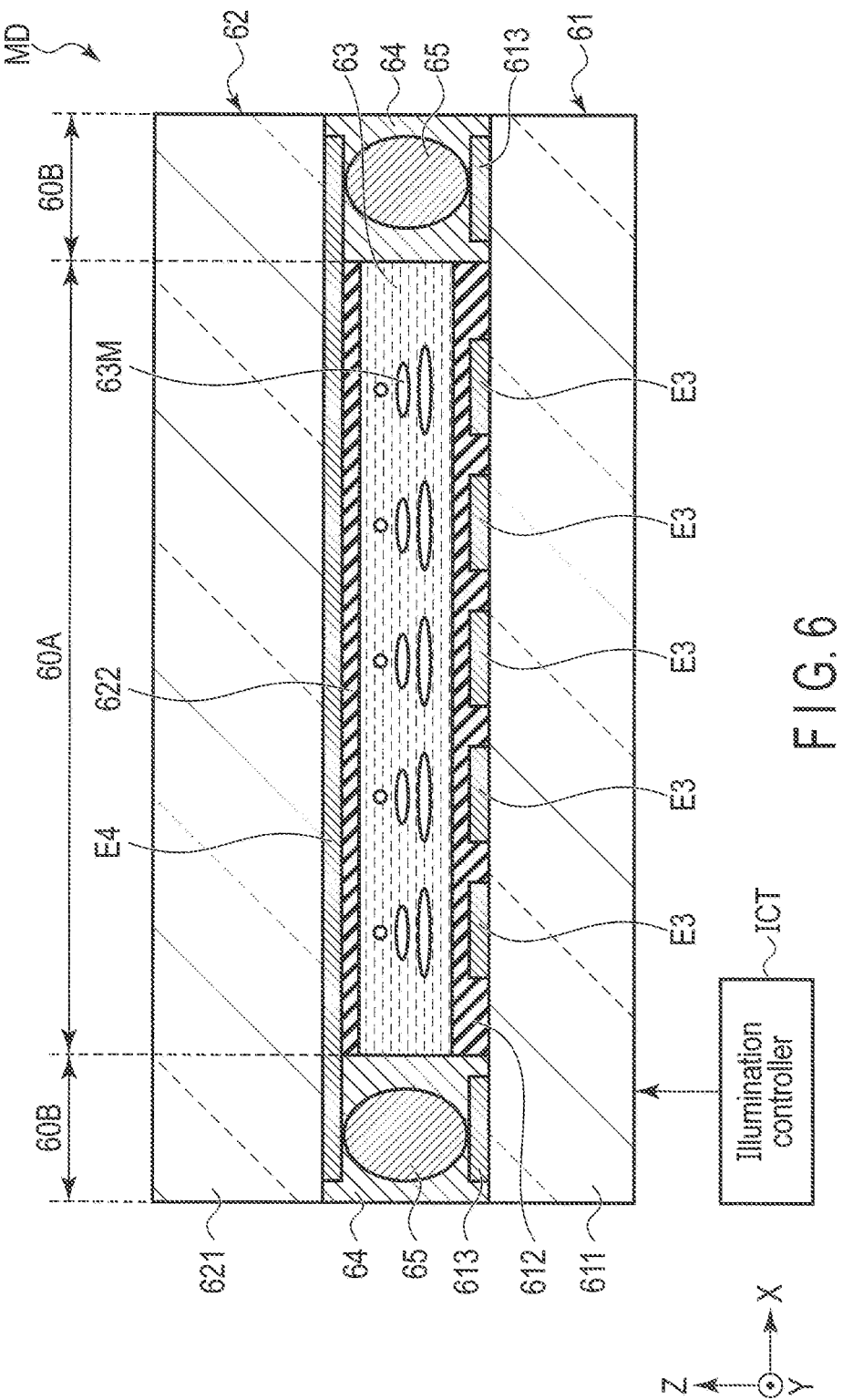
F I G. 6

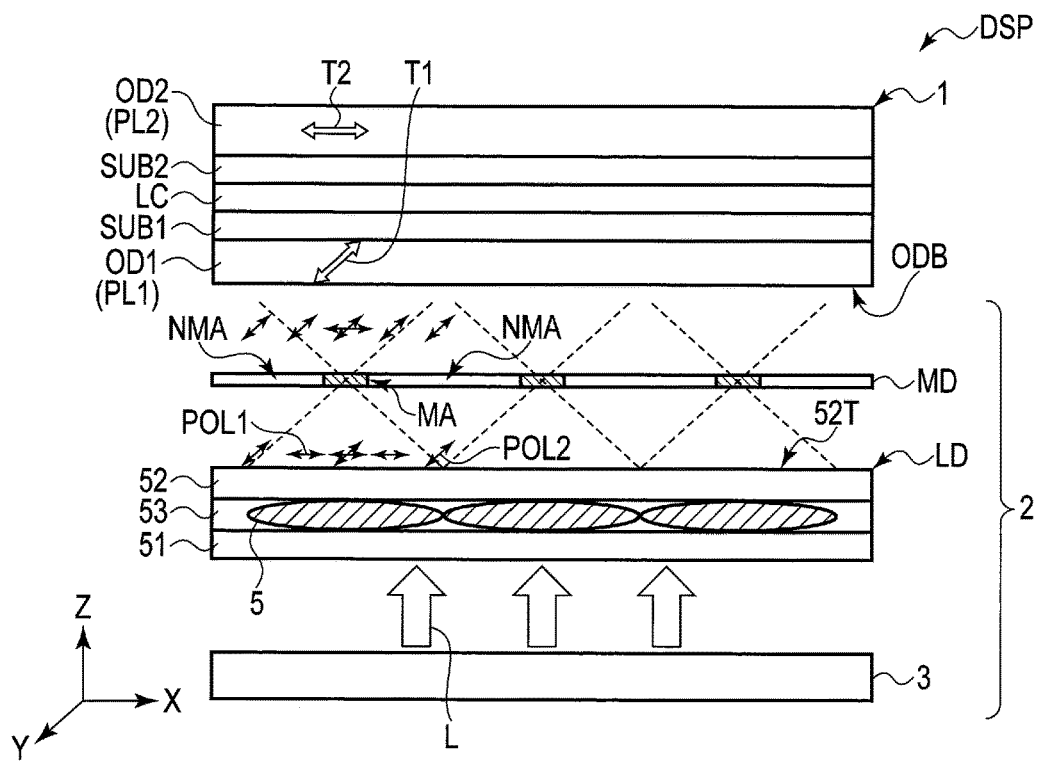
F I G. 12
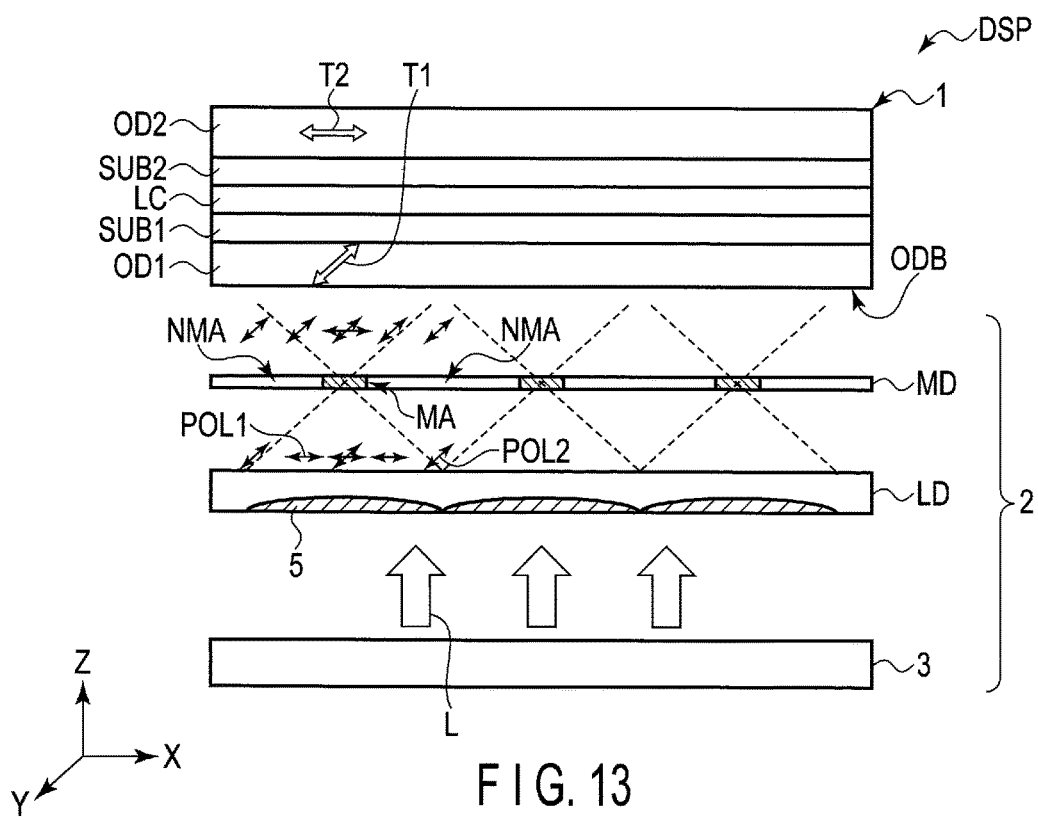
F I G. 13

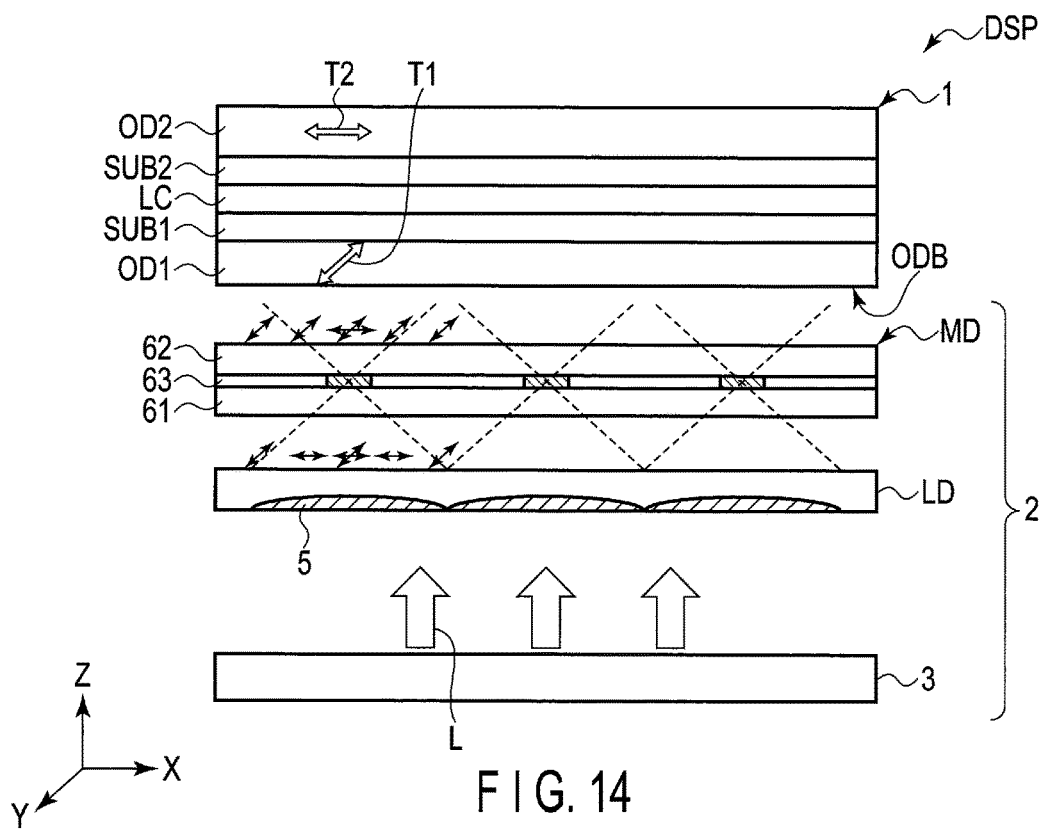
F I G. 14
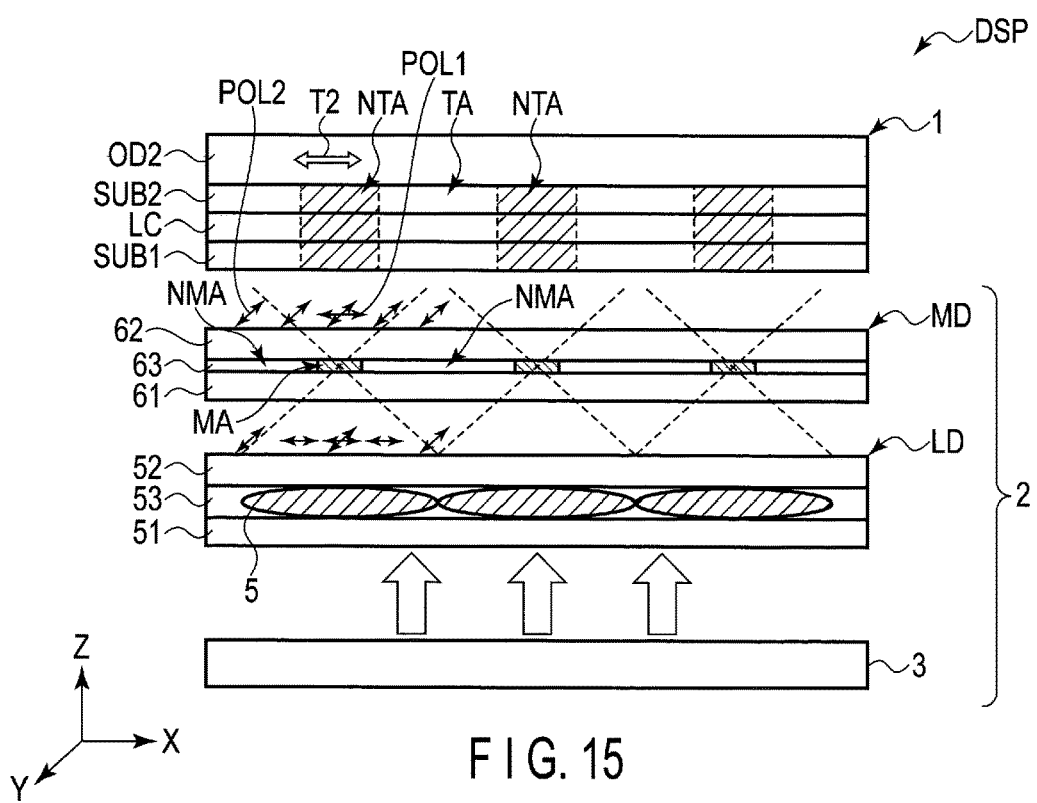
F I G. 15

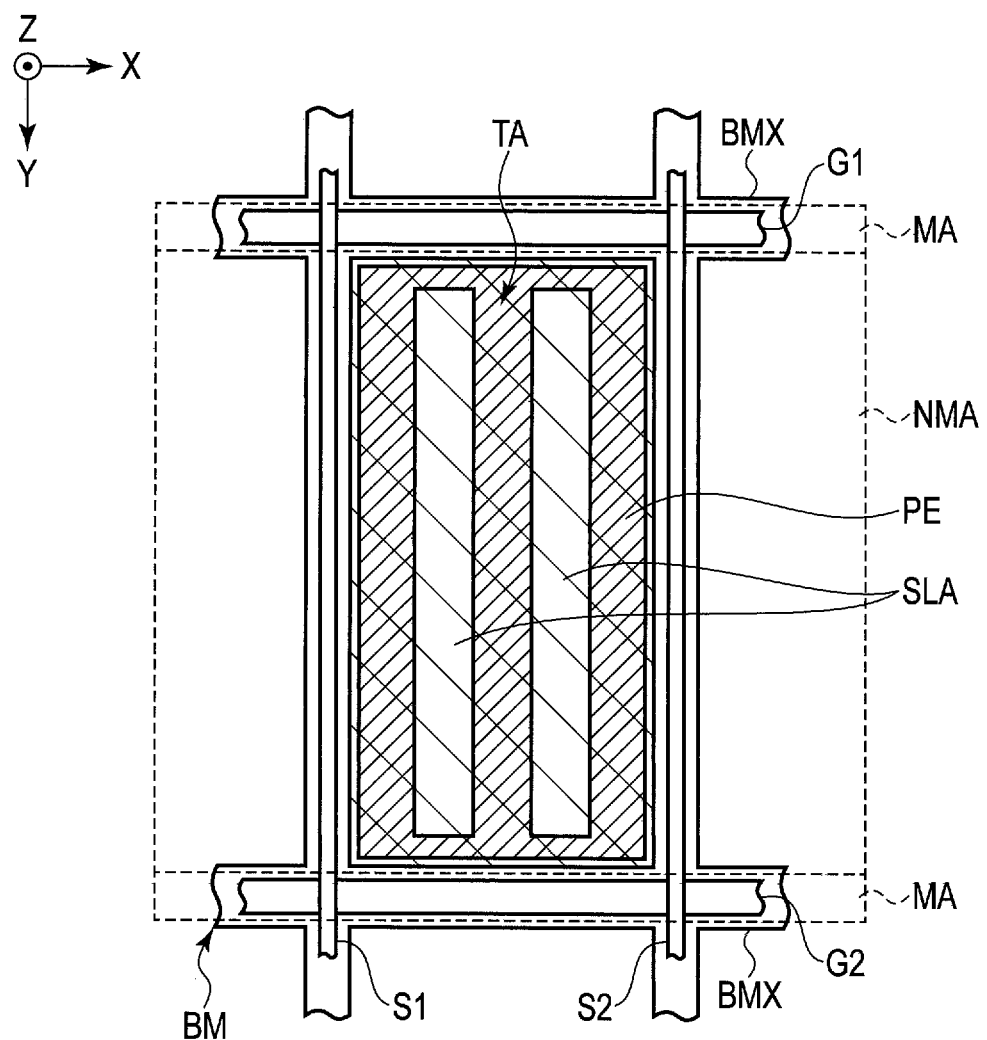
F I G. 16

ILLUMINATION DEVICE AND DISPLAY DEVICE

CROSS-REFERENCE TO RELATED APPLICATIONS

This application is based upon and claims the benefit of priority from Japanese Patent Application No. 2017-057863, filed Mar. 23, 2017, the entire contents of which are incorporated herein by reference.

FIELD

Embodiments described herein relate generally to an illumination device and a display device.

BACKGROUND

For example, an image display device comprising a diffusion-control liquid crystal panel and a liquid crystal display panel has been proposed. The diffusion-control liquid crystal panel can switch a state between a lens formation state of diffusing linearly polarized light, oscillating in a predetermined direction, of light having directivity in a specific direction, and a non-lens formation state of transmitting the light while maintaining the directivity of the light. In the lens formation state, a plurality of liquid crystal micro-lenses are formed by applying a voltage to a liquid crystal layer.

Apart from the above, various technologies for forming the lens in the liquid crystal layer are known.

BRIEF DESCRIPTION OF THE DRAWINGS

FIG. 6 is a cross-sectional view showing a configuration example of a modulation element MD.

FIG. 12 is an illustration showing a second example of the display device DSP.

FIG. 13 is an illustration showing a third example of the display device DSP.

FIG. 14 is an illustration showing a fourth example of the display device DSP.

FIG. 15 is an illustration showing a fifth example of the display device DSP.

FIG. 16 is a plan view showing an example of a positional relationship of a modulation portion MA and a non-modulation portion NMA with a non-transmission portion NTA and a transmission portion TA shown in FIG. 15.

DETAILED DESCRIPTION

Figure 1:
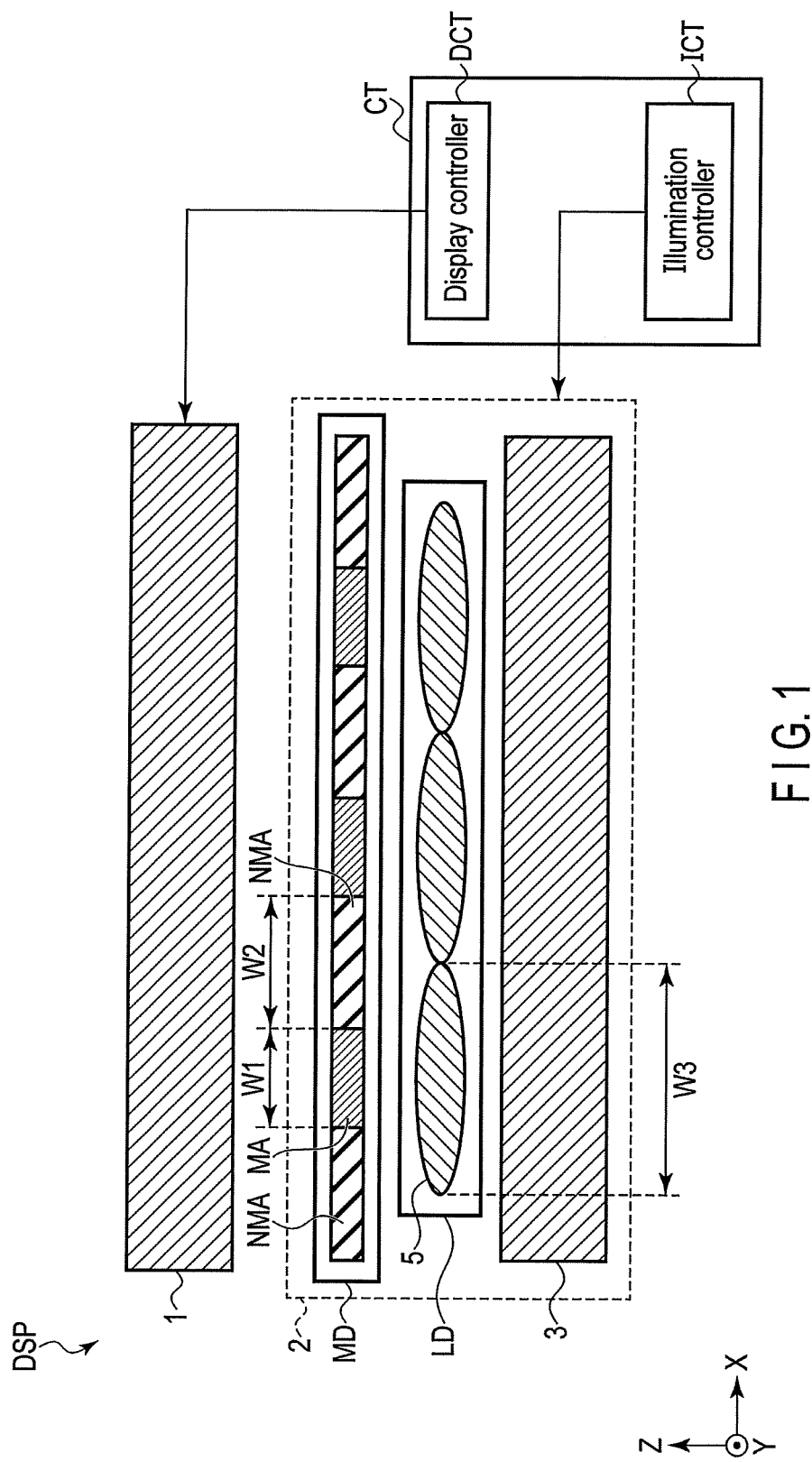
FIG. 1 is an illustration showing a configuration example of a display device DSP of the present embodiment.

In general, according to one embodiment, an illumination device includes a light source unit which emits light, a modulation element comprising a modulation portion which modulates incident light, and a non-modulation portion which is adjacent to the modulation portion; and a liquid crystal element located between the light source unit and the modulation element, the liquid crystal element forming a lens between the light source unit and the modulation portion.

According to another embodiment, a display device includes a display panel, and an illumination device which illuminates the display panel. The illumination device includes a light source unit which emits light toward the display panel, a modulation element located between the light source unit and the display panel, the modulation element comprising a modulation portion which modulates incident light, and a non-modulation portion which is adjacent to the modulation portion, and a liquid crystal element located between the light source unit and the modulation element, the liquid crystal element forming a lens between the light source unit and the modulation portion.

Embodiments will be described hereinafter with reference to the accompanying drawings. The disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc., of the respective parts are illustrated in the drawings schematically, rather than as an accurate representation of what is implemented. However, such schematic illustration is merely exemplary, and in no way restricts the interpretation of the invention. In addition, in the specification and drawings, structural elements which function in the same or a similar manner to those described in connection with preceding drawings are denoted by like reference numbers, and redundant detailed description thereof is omitted unless necessary.

FIG. 1 is an illustration showing a configuration example of a display device DSP of the present embodiment. While a first direction X, a second direction Y, and a third direction Z in the drawing are orthogonal to each other, they may cross each other at an angle other than 90 degrees.

The display device DSP comprises a display panel 1, an illumination device 2 which illuminates the display panel 1, and a controller CT. Although the details of the display panel 1 will be described later, in one example, the display panel 1 is a liquid crystal display panel.

The illumination device 2 comprises a light source unit 3, a liquid crystal element LD comprising a lens 5, and a modulation element MD comprising a modulation portion MA and a non-modulation portion NMA. The light source unit 3 emits light toward the display panel 1. Although the details of the light source unit 3 will not be described here, the light source unit 3 may be, for example, an edge-light-type device comprising a plate-like light-guide arranged directly under the display panel 1 and a light source arranged along an edge of the light-guide, or may be a direct-type device comprising a light source arranged directly under the display panel 1.

The liquid crystal element LD and the modulation element MD are opposed to each other in the third direction Z. The lens 5 formed by a plurality of liquid crystal molecules is located between the light source unit 3 and the display panel 1, or between the light source unit 3 and the modulation portion MA, or between the light source unit 3 and the non-modulation portion NMA. The modulation portion MA and the non-modulation portion NMA are located between the lens 5 and the display panel 1. The light source unit 3, the lens 5, the modulation element MD (the modulation portion MA and the non-modulation portion NMA), and the display panel 1 are arranged in this order along the third direction Z.

The lens 5 refracts part of light emitted from the light source unit 3. A plurality of lenses 5 are arranged in the first direction X, for example. Each of the lenses 5 has a width W3 in the first direction X, and extends in the second direction Y. A direction in which the modulation portion MA and the non-modulation portion NMA are arranged is the same as a direction in which the lenses 5 are arranged. That is, a plurality of modulation portions MA are arranged at intervals in the first direction X. The non-modulation portion NMA is adjacent to the modulation portion MA. In the example illustrated, the modulation portions MA and the non-modulation portions NMA are arranged alternately along the first direction X. The modulation portion MA is smaller than the non-modulation portion NMA. In one example, a width W1 of the modulation portion MA along the first direction X is smaller than a width W2 of the non-modulation portion NMA along the first direction X. The width W1 of the modulation portion MA is smaller than the width W3 of the lens 5 along the first direction X. For example, the width W1 is 4 to 5 μm, and the width W3 is 50 to 60 μm. Note that the modulation portion MA and the non-modulation portion NMA may be fixed at predetermined positions, or may be structured to vary their positions. Further, the lens 5 may be fixed at a predetermined position, or may be structured to vary its position.

The controller CT comprises a display controller DCT and an illumination controller ICT. The display controller DCT controls the display panel 1. The illumination controller ICT controls the illumination device 2.

Next, a configuration example of the liquid crystal element LD will be described.

Figure 2:
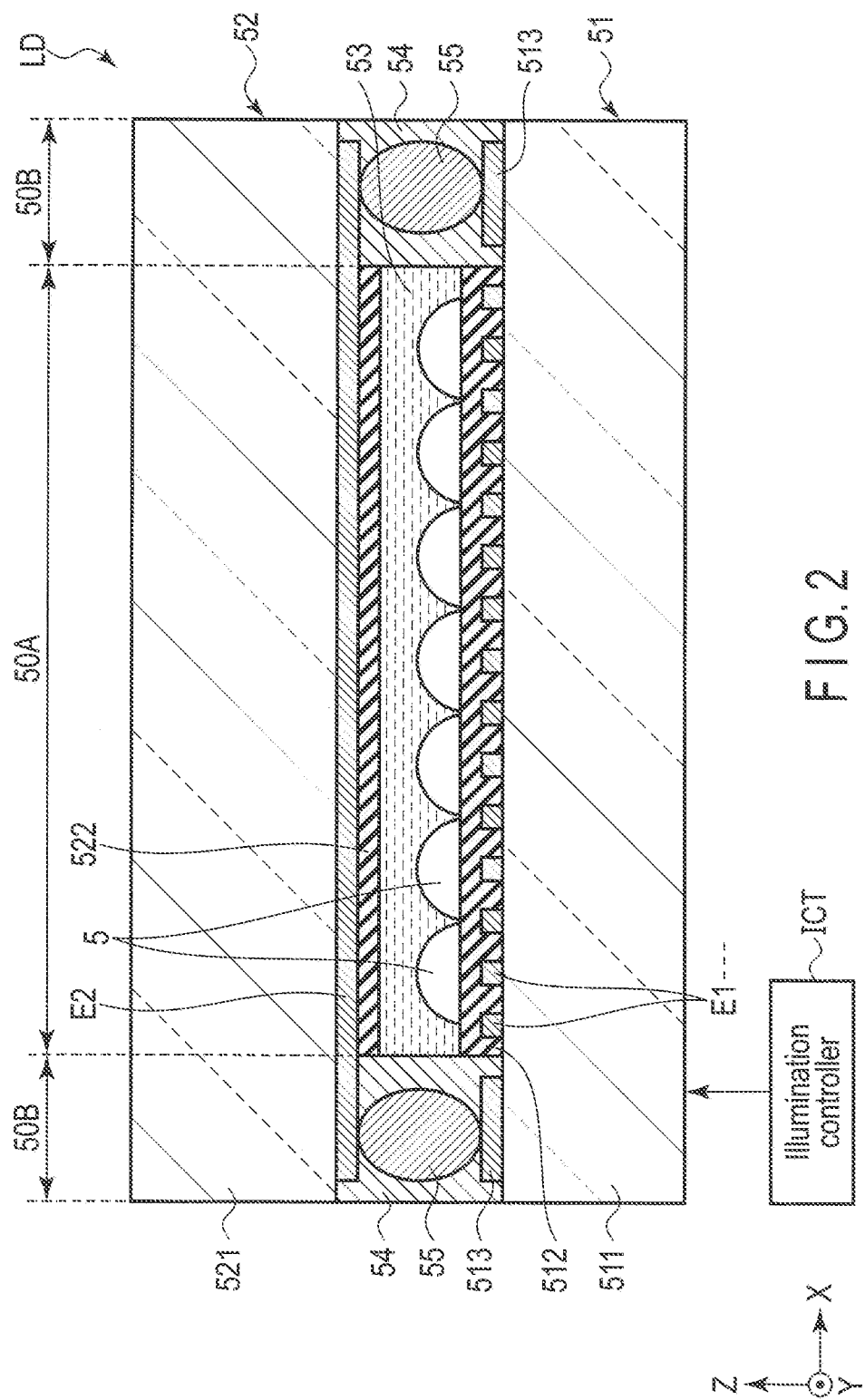
FIG. 2 is a cross-sectional view showing a configuration example of a liquid crystal element LD.

FIG. 2 is a cross-sectional view showing a configuration example of the liquid crystal element LD. The liquid crystal element LD comprises a first substrate 51, a second substrate 52, a first liquid crystal layer 53 comprising liquid crystal molecules, a first control electrode E1, and a second control electrode E2. In the example illustrated, the first control electrode E1 is provided on the first substrate 51, and the second control electrode E2 is provided on the second substrate 52. However, the first control electrode E1 and the second control electrode E2 may both be provided on the same substrate, that is, on the first substrate 51 or the second substrate 52.

The first substrate 51 comprises a transparent insulating substrate 511, the first control electrode E1, an alignment film 512, and a feeder 513. The first control electrode E1 is located between the insulating substrate 511 and the first liquid crystal layer 53.

The first control electrodes E1 are arranged at intervals in the first direction X in an effective area 50A. In one example, a width of each of the first control electrodes E1 along the first direction X is less than or equal to an interval between adjacent first control electrodes E1 along the first direction X. The alignment film 512 covers the first control electrodes E1, and is in contact with the first liquid crystal layer 53. The feeder 513 is located in a non-effective area 50B outside the effective area 50A.

The second substrate 52 comprises a transparent insulating substrate 521, the second control electrode E2, and an alignment film 522. The second control electrode E2 is located between the insulating substrate 521 and the first liquid crystal layer 53.

The second control electrode E2 is, for example, a single plate electrode which is located on substantially the entire surface of the effective area 50A, and also extends to the non-effective area 50B. The second control electrode E2 is opposed to the first control electrode E1 via the first liquid crystal layer 53 in the effective area 50A. The second control electrode E2 is opposed to the feeder 513 in the non-effective area 50B. The alignment film 522 covers the second control electrode E2, and is in contact with the first liquid crystal layer 53.

Each of the insulating substrates 511 and 521 is, for example, a glass substrate or a resin substrate. Each of the first control electrode E1 and the second control electrode E2 is formed of a transparent conductive material such as indium tin oxide (ITO) or indium zinc oxide (IZO). Each of the alignment films 512 and 522 is, for example, a horizontal alignment film, and is subjected to alignment treatment in the first direction X.

The first substrate 51 and the second substrate 52 are bonded to each other by a sealant 54 in the non-effective area 50B. The sealant 54 includes a conductive material 55. The conductive material 55 is interposed between the feeder 513 and the second control electrode E2, and electrically connects the feeder 513 and the second control electrode E2.

The first liquid crystal layer 53 is held between the first substrate 51 and the second substrate 52. The first liquid crystal layer 53 is formed of, for example, a liquid crystal material having positive dielectric anisotropy. The first control electrode E1 and the second control electrode E2 apply, to the first liquid crystal layer 53, a voltage for forming the lens 5 in the first liquid crystal layer 53.

The illumination controller ICT controls the voltage to be applied to the first liquid crystal layer 53. By controlling the voltage to be applied to each of the first control electrode E1 and the second control electrode E2, the illumination controller ICT can switch a mode between a mode in which the lens 5 is formed in the first liquid crystal layer 53 and a mode in which a lens is not formed in the first liquid crystal layer 53. Further, by controlling the voltage to be applied to each of the first control electrodes E1, the illumination controller ICT can control a position where the lens 5 is formed, and can switch a mode between a mode in which the lens 5 is formed at a first position of the first liquid crystal layer 53 and a mode in which the lens 5 is formed at a second position, which is different from the first position, of the first liquid crystal layer 53. Furthermore, by controlling the voltage to be applied to each of the first control electrodes E1, the illumination controller ICT can switch a mode between a mode in which the lens 5 of a first shape is formed in the first liquid crystal layer 53 and a mode in which the lens 5 of a second shape, which is different from the first shape, is formed in the first liquid crystal layer 53. Furthermore, by controlling the voltage to be applied to each of the first control electrodes E1, the illumination controller ICT can switch a mode between a mode in which the lens 5 of a first size is formed in the first liquid crystal layer 53 and a mode in which the lens 5 of a second size, which is different from the first size, is formed in the first liquid crystal layer 53. The illustrated example corresponds to a case where a plurality of lenses 5 are formed in the first liquid crystal layer 53. However, a single lens 5 may be formed in the first liquid crystal layer 53.

Figure 3:
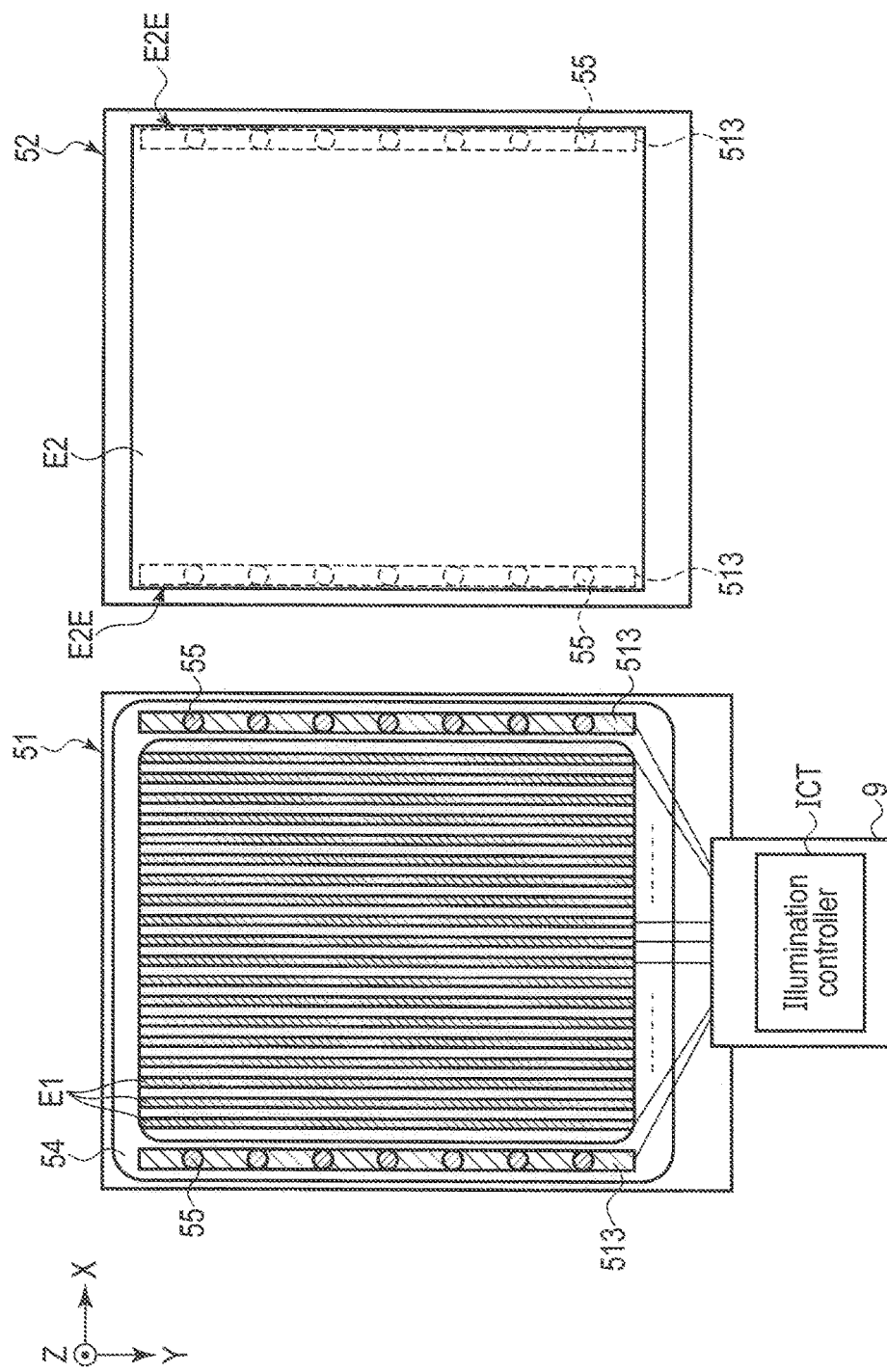
FIG. 3 is a plan view showing a configuration example of the liquid crystal element LD.

FIG. 3 is a plan view showing a configuration example of the liquid crystal element LD. FIG. 3(a) is a plan view of the first substrate 51, and FIG. 3(b) is a plan view of the second substrate 52.

In the first substrate 51 shown in FIG. 3(a), the sealant 54 is formed in a frame shape. The first control electrodes E1 are located at an inner side surrounded by the sealant 54, and are arranged at intervals in the first direction X. Each of the first control electrodes E1 is, for example, a strip electrode extending in the second direction Y. Alternatively, the first control electrodes E1 may each be a strip electrode extending in the first direction X, or may be island-shaped electrodes arranged in the first direction X and the second direction Y. The shape of the island-shaped electrode is polygonal, such as rectangular or hexagonal, or circular. The feeder 513 extends in the second direction Y at a position overlapping the sealant 54. At least a part of the conductive material 55 included in the sealant 54 overlaps the feeder 513. A wiring substrate 9 is connected to the first substrate 51, and electrically connects each of the first control electrodes E1 and the feeder 513 with the illumination controller ICT.

In the second substrate 52 shown in FIG. 3(b), the second control electrode E2 is formed rectangular, and includes an end portion E2E extending in the second direction Y. The end portion E2E overlaps the feeder 513 and the conductive material 55. That is, the second control electrode E2 is electrically connected to the illumination controller ICT via the conductive material 55 and the feeder 513.

Figure 4:
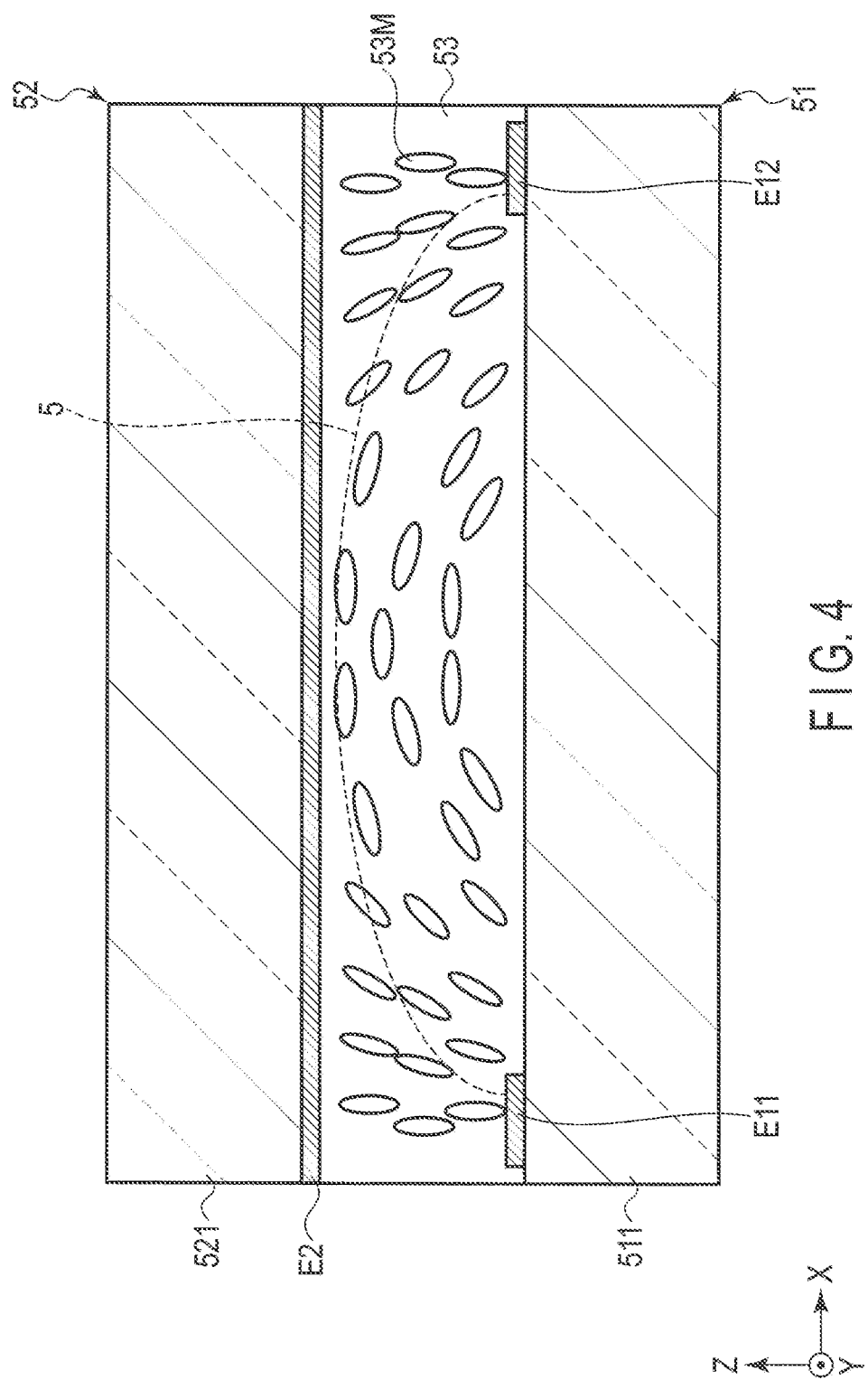
FIG. 4 is an illustration for explaining a lens 5 formed in a first liquid crystal layer 53.

FIG. 4 is an illustration for explaining the lens 5 formed in the first liquid crystal layer 53. FIG. 4 illustrates only the structures necessary for explanation. Here, a case of applying a voltage, which is different from that applied to first control electrodes E11 and E12, to the second control electrode E2 will be described.

In one example, as described above, the first liquid crystal layer 53 has positive dielectric anisotropy. Liquid crystal molecules 53M included in the first liquid crystal layer 53 are initially aligned such that their major axes are aligned in the first direction X in a state where an electric field is not formed, and are aligned such that the major axes of the liquid crystal molecules 53M are aligned along an electric field in a state where the electric field is formed.

In one example, a voltage of 6V is applied to the first control electrode E11, a voltage of −6V is applied to the first control electrode E12, and a voltage of 0V is applied to the second control electrode E2. In regions in which the first control electrodes E11 and E12 are opposed to the second control electrode E2, an electric field along the third direction Z is formed. Therefore, the liquid crystal molecules 53M are aligned such that their major axes are aligned along the third direction Z. In a region between the first control electrode E11 and the first control electrode E12, an electric field which is tilted with respect to the third direction Z is formed. Therefore, the liquid crystal molecules 53M are aligned such that their major axes are tilted with respect to the third direction Z. In an intermediate region, which is a region intermediate between the first control electrode E11 and the first control electrode E12, an electric field is hardly formed or an electric field along the first direction X is formed.

Therefore, the liquid crystal molecules 53M are aligned such that their major axes are aligned along the first direction X. The liquid crystal molecule 53M has refractive anisotropy $\Delta n$. Accordingly, the first liquid crystal layer 53 has a refractive-index distribution according to an alignment state of the liquid crystal molecules 53M. In other words, the first liquid crystal layer 53 has a retardation distribution which is represented by $\Delta n \cdot d$ or a phase distribution, where d is a thickness of the first liquid crystal layer 53 along the third direction Z. Thickness d is, for example, 10 to 100 μm. The lens 5 shown by a dotted line in the drawing is one that is formed by the refractive-index distribution, retardation distribution, or phase distribution described above. The illustrated lens 5 functions as a convex lens.

In the present embodiment, a system formed by a combination of the first liquid crystal layer 53 including liquid crystal molecules which are initially aligned substantially horizontally along a substrate main surface and an electric field formed along a direction intersecting the substrate main surface has been explained, as an example of the liquid crystal element LD comprising the lens 5. However, the liquid crystal element LD comprising the lens 5 is not limited to the above. For example, in forming the system, a liquid crystal layer including liquid crystal molecules which are initially aligned substantially perpendicularly to the substrate main surface may be combined, or an electric field formed along the substrate main surface may be combined. In other words, as long as the system can vary the refractive-index distribution according to an electric field applied to the liquid crystal layer, a liquid crystal element comprising the lens 5 can be realized. The substrate main surface mentioned above refers to an X-Y plane defined by the first direction X and the second direction Y.

Figure 5:
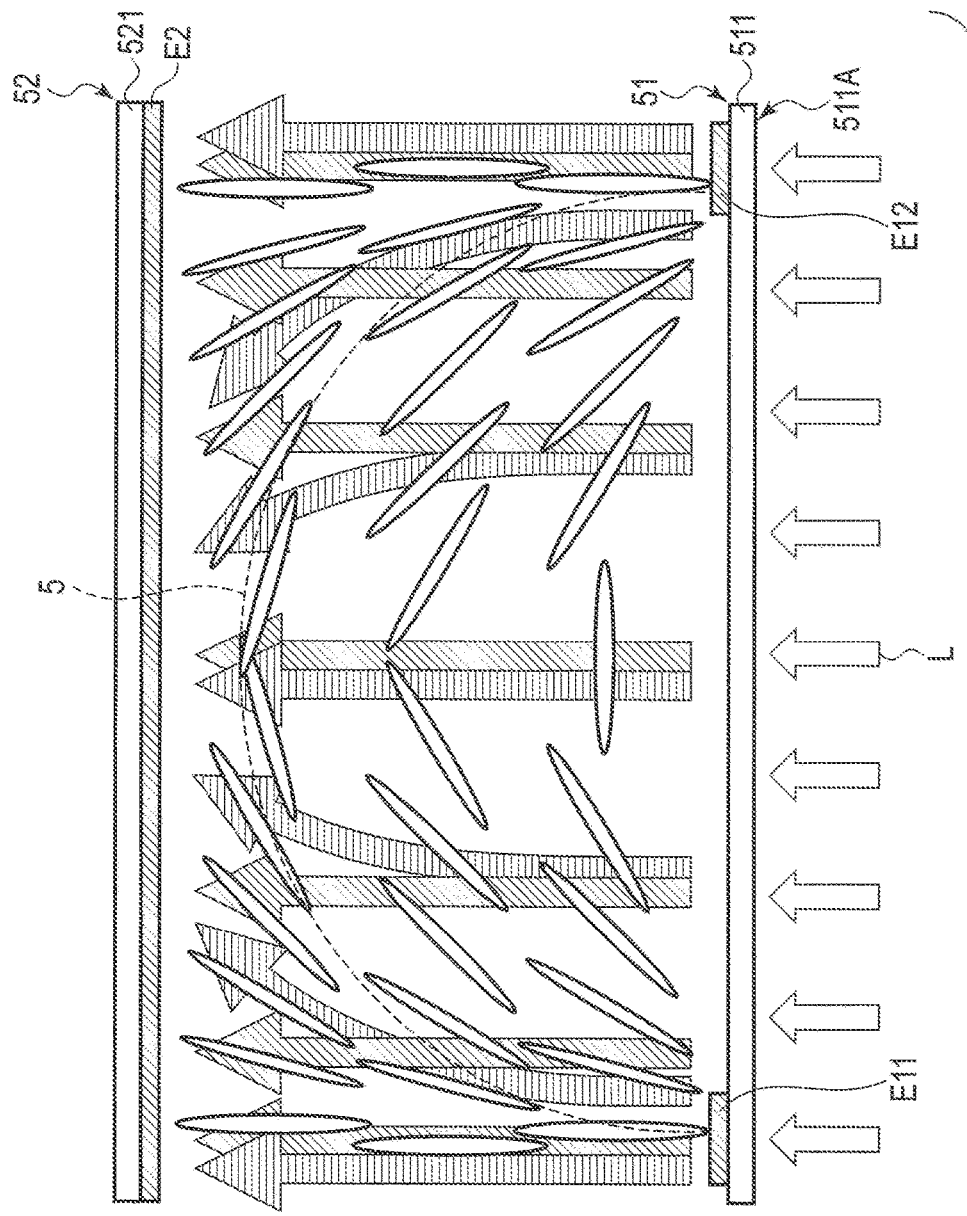
FIG. 5 is an illustration for explaining the function of the lens 5 shown in FIG. 4.

FIG. 5 is an illustration for explaining the function of the lens 5 shown in FIG. 4.

Here, when a traveling direction of light is along the third direction Z, linearly polarized light having an oscillation plane along the first direction X is referred to as first polarized light POL1, and linearly polarized light having an oscillation plane along the second direction Y is referred to as second polarized light POL2. Note that the traveling direction of light is the same as a direction indicated by an arrow representing the third direction Z in the example illustrated. The first polarized light POL1 is shown by an arrow having a horizontal stripe pattern in the drawing, and the second polarized light POL2 is shown by an arrow having a slanting stripe pattern in the drawing. Light L is, for example, natural light having random oscillation planes, and is assumed to enter from an outer surface 511A of the insulating substrate 511, and travel from the first substrate 51 toward the second substrate 52.

The lens 5 has different functions on the first polarized light POL1 and the second polarized light POL2, respectively. That is, of the natural light L, the lens 5 transmits the second polarized light POL2 practically without refracting the second polarized light POL2, and refracts the first polarized light POL1. In other words, the lens 5 exhibits a convergence function on mainly the first polarized light POL1.

Next, a configuration example of the modulation element MD will be described.

FIG. 6 is a cross-sectional view showing a configuration example of the modulation element MD. Here, a case where the modulation element MD is constituted by a liquid crystal element will be described. Such a modulation element MD is controlled by the illumination controller ICT.

The modulation element MD comprises a third substrate 61, a fourth substrate 62, a second liquid crystal layer 63, a third control electrode E3, and a fourth control electrode E4. In the example illustrated, the third control electrode E3 is provided on the third substrate 61, and the fourth control electrode E4 is provided on the fourth substrate 62. However, the third control electrode E3 and the fourth control electrode E4 may both be provided on the same substrate, that is, on the third substrate 61 or the fourth substrate 62.

The third substrate 61 comprises a transparent insulating substrate 611, the third control electrode E3, an alignment film 612, and a feeder 613. The third control electrode E3 is located between the insulating substrate 611 and the second liquid crystal layer 63. The third control electrodes E3 are arranged at intervals in the first direction X in an effective area 60A. In one example, a width of each of the third control electrodes E3 along the first direction X is greater than an interval between adjacent third control electrodes E3 along the first direction X. The alignment film 612 covers the third control electrodes E3, and is in contact with the second liquid crystal layer 63. The feeder 613 is located in a non-effective area 60B outside the effective area 60A.

The fourth substrate 62 comprises a transparent insulating substrate 621, the fourth control electrode E4, and an alignment film 622. The fourth control electrode E4 is located between the insulating substrate 621 and the second liquid crystal layer 63. The fourth control electrode E4 is, for example, a single plate electrode which is located on substantially the entire surface of the effective area 60A, and also extends to the non-effective area 60B. The fourth control electrode E4 is opposed to the third control electrode E3 via the second liquid crystal layer 63 in the effective area 60A. The fourth control electrode E4 is opposed to the feeder 613 in the non-effective area 60B. The alignment film 622 covers the fourth control electrode E4, and is in contact with the second liquid crystal layer 63.

Each of the insulating substrates 611 and 621 is, for example, a glass substrate or a resin substrate. Each of the third control electrode E3 and the fourth control electrode E4 is formed of a transparent conductive material such as ITO or IZO. The third control electrode E3 is a strip electrode extending in the second direction Y likewise the first control electrode E1 shown in FIG. 3. The fourth control electrode E4 is a rectangular plate electrode likewise the second control electrode E2 shown in FIG. 3. Each of the alignment films 612 and 622 is, for example, a horizontal alignment film. In one example, the alignment film 612 is subjected to alignment treatment in the first direction X, and the alignment film 622 is subjected to alignment treatment in the second direction Y.

The third substrate 61 and the fourth substrate 62 are bonded to each other by a sealant 64 in the non-effective area 60B. The sealant 64 includes a conductive material 65. The conductive material 65 is interposed between the feeder 613 and the fourth control electrode E4, and electrically connects the feeder 613 and the fourth control electrode E4.

The second liquid crystal layer 63 is held between the third substrate 61 and the fourth substrate 62. The second liquid crystal layer 63 is formed of, for example, a liquid crystal material having positive dielectric anisotropy. The third control electrode E3 and the fourth control electrode E4 apply a voltage for forming the modulation portion MA and the non-modulation portion NMA shown in FIG. 1 to the second liquid crystal layer 63.

The illumination controller ICT controls the voltage to be applied to the second liquid crystal layer 63. As the illumination controller ICT controls the voltage applied to each of the third control electrode E3 and the fourth control electrode E4, the modulation portion MA and the non-modulation portion NMA can be formed in the second liquid crystal layer 63. It should be noted that only the modulation portion MA can be formed in the second liquid crystal layer 63, or only the non-modulation portion NMA can be formed in the second liquid crystal layer 63. Further, as the illumination controller ICT controls the voltage applied to each of the third control electrodes E3, the positions where the modulation portion MA and the non-modulation portion NMA are formed can be controlled.

Furthermore, as the illumination controller ICT controls the voltage applied to each of the third control electrodes E3, the size of the modulation portion MA and the non-modulation portion NMA can be controlled freely.

Figure 7:
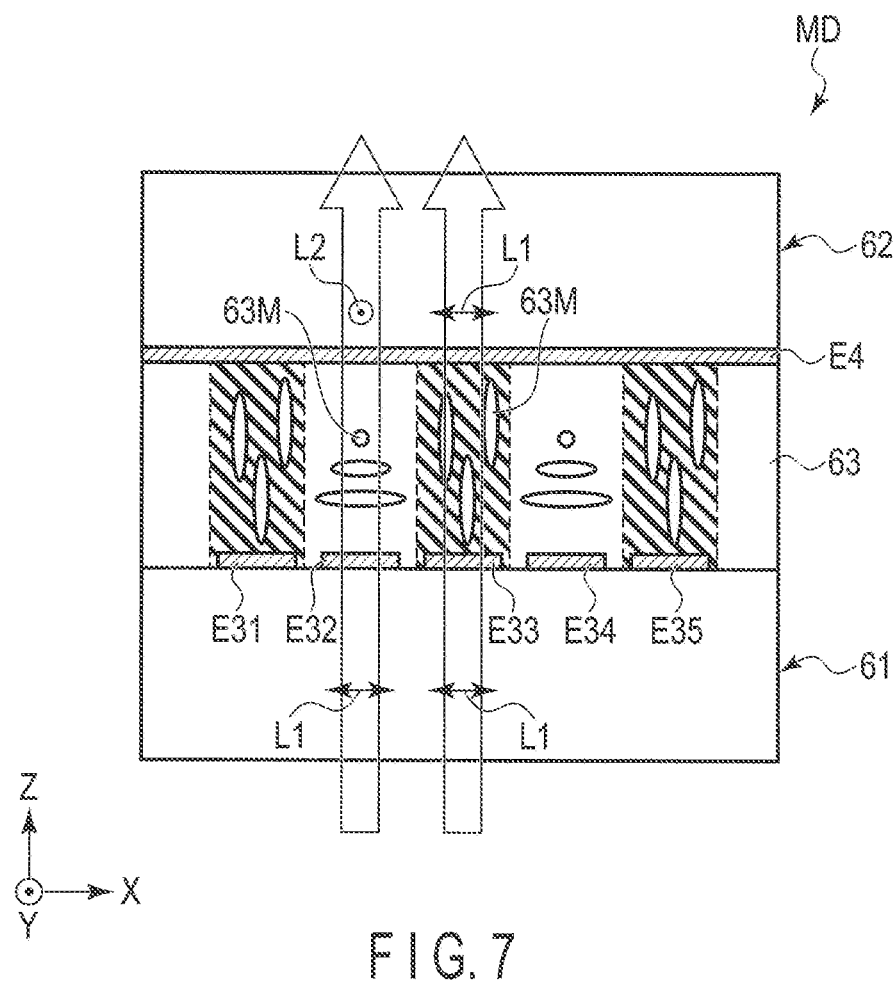
FIG. 7 is an illustration for explaining a modulation portion MA and a non-modulation portion NMA formed in the modulation element MD.

FIG. 7 is an illustration for explaining the modulation portion MA and the non-modulation portion NMA formed in the modulation element MD. FIG. 7 illustrates only the structures necessary for explanation. Here, a case where a voltage, which is different from that applied to the fourth control electrode E4, is applied to third control electrodes E31, E33, and E35, of a plurality of third control electrodes E31 to E35 arranged in the first direction X, will be described.

As described above, the second liquid crystal layer 63 has the positive dielectric anisotropy. Liquid crystal molecules 63M included in the second liquid crystal layer 63 are twisted-aligned by 90 degrees in a state where no electric field is formed. In other words, the liquid crystal molecules 63M near the third control electrodes E31 to E35 are initially aligned such that their major axes are aligned in the first direction X, and the liquid crystal molecules 63M near the fourth control electrode E4 are initially aligned such that their major axes are aligned in the second direction Y. Further, the liquid crystal molecules 63M are aligned such that their major axes are aligned along an electric field in a state where the electric field is formed.

As an example, a case where the voltage of the third control electrodes E31, E33, and E35 is 6V, and the voltage of the third control electrodes E32 and E34 and the fourth control electrode E4 is 0V will be described below. In each of regions in which the third control electrodes E31, E33, and E35 are opposed to the fourth control electrode E4, an electric field along the third direction Z is formed. Therefore, the liquid crystal molecules 63M are vertically aligned such that their major axes are aligned along the third direction Z. In each of regions in which the third control electrodes E32 and E34 are opposed to the fourth control electrode E4, an electric field is not formed. Therefore, the liquid crystal molecules 63M are maintained in the initial alignment state, and twisted-aligned.

Here, a case where the first polarized light POL1 enters the modulation element MD is assumed. Of beams of the first polarized light POL1 which enter from the third substrate 61, a beam of the first polarized light POL1, which enters a region in which the third control electrode E32 and the fourth control electrode E4 are opposed to each other, is affected by the twisted-aligned liquid crystal molecules 63M, and the polarization plane is rotated. Thus, after the above first polarized light POL1 passes through the second liquid crystal layer 63, it is converted into the second polarized light POL2 having an oscillation plane along the second direction Y. Similarly in the region in which the third control electrode E34 is opposed to the fourth control electrode E4, the transmitted light is converted into the second polarized light POL2. Meanwhile, the first polarized light POL1 incident on a region in which the third control electrode E33 and the fourth control electrode E4 are opposed to each other is hardly affected by the liquid crystal molecules 63M that are vertically aligned. Thus, the above first polarized light POL1 passes through the second liquid crystal layer 63 while maintaining its polarization plane. Similarly in the regions in which the third control electrodes E31 and E35 are opposed to the fourth control electrode E4, the transmitted light is the first polarized light POL1.

Regions in which the third control electrodes E31, E33, and E35 are opposed to the fourth control electrode E4 correspond to the non-modulation portions NMA shown in FIG. 1, and regions in which the third control electrodes E32 and E34 are opposed to the fourth control electrode E4 correspond to the modulation portions MA shown in FIG. 1. In other words, the modulation portion MA has the function of imparting a retardation to the incident light, and imparts, for example, a retardation of approximately λ/2 to the incident light. λ indicates a wavelength of the incident light. When the incident light is linearly polarized light, the modulation portion MA as described above has the function of rotating the polarization plane of the linearly polarized light by approximately 90 degrees. As in the illustrated example, the modulation portion MA has the function of converting the first polarized light POL1 into the second polarized light POL2. Also, the modulation portion MA has the function of converting the second polarized light POL2 into the first polarized light POL1. The non-modulation portion NMA transmits the incident light practically without modulating the same.

In the present embodiment, as an example of the modulation element MD, a system obtained by a combination of the second liquid crystal layer 63 including liquid crystal molecules twisted-aligned in the initial alignment state and an electric field produced along a direction intersecting the substrate main surface has been explained. However, the modulation element MD is not limited to the above. That is, as long as the system can form a region which modulates the incident light in accordance with a voltage applied to the second liquid crystal layer 63, and a region which transmits the incident light without modulating the same, such a system is applicable to the modulation element MD described above.

In the example explained above, since each of the third control electrodes E31 to E35 is a strip electrode extending in the second direction Y, the modulation portion MA and the non-modulation portion NMA are formed in a strip shape extending in the second direction Y. Alternatively, the third control electrodes E3 may be a strip electrode extending in the first direction X, and in this case, the modulation portion MA and the non-modulation portion NMA are formed in a strip shape extending in the first direction X. Further, the third control electrodes E3 may be arranged in a matrix, and in this case, the modulation portion MA and the non-modulation portion NMA can be formed in a free shape such as a dot shape or a strip shape.

Next, the illumination device 2 comprising the above-described liquid crystal element LD and the modulation element MD will be explained.

Figure 8:
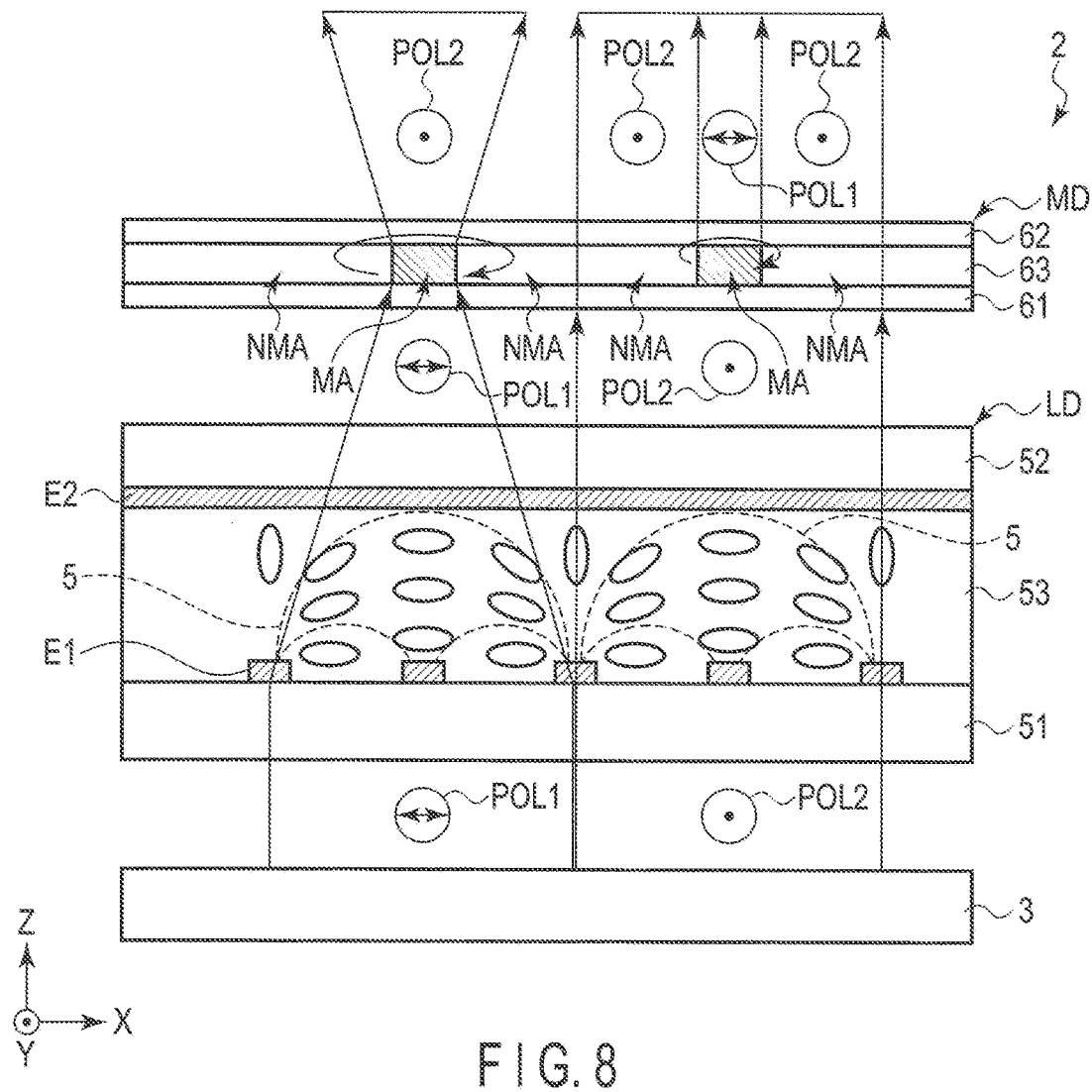
FIG. 8 is an illustration for explaining the function of the liquid crystal element LD and the modulation element MD.

FIG. 8 is an illustration for explaining the function of the liquid crystal element LD and the modulation element MD. The liquid crystal element LD is located above the light source unit 3, and the modulation element MD is located above the liquid crystal element LD. In the example illustrated, a polarizer does not exist between the light source unit 3 and the liquid crystal element LD, or between the liquid crystal element LD and the modulation element MD. The first substrate 51 is opposed to the light source unit 3. The second substrate 52 is opposed to the third substrate 61. The lens 5 formed in the first liquid crystal layer 53 is opposed to the modulation element MD. In the modulation element MD, the modulation portion MA is arranged at a position where the light is converged by the lens 5. The first substrate 51 and the light source unit 3 may be spaced apart from each other, or be in contact with each other, or another member may be interposed between the two. The second substrate 52 and the third substrate 61 may be spaced apart from each other, or be in contact with each other, or another member may be interposed between the two.

Of the light incident on the liquid crystal element LD from the light source unit 3, the first polarized light POL1 is converged by the lens 5 and enters the modulation element MD, as shown on the left side of the drawing. Almost all of the first polarized light POL1 enters the modulation portion MA, and is converted into the second polarized light POL2. That is, the first polarized light POL1 which has entered the liquid crystal element LD is converted into the second polarized light POL2, and passes through the modulation element MD.

Meanwhile, of the light incident on the liquid crystal element LD from the light source unit 3, the second polarized light POL2 enters the modulation element MD practically without being converged by the lens 5, as shown on the right side of the drawing. The second polarized light POL2 enters the modulation portion MA and the non-modulation portion NMA. As stated above, since the non-modulation portion NMA is larger than the modulation portion MA, of the light incident on the modulation element MD, light incident on the non-modulation portion NMA is more than light which is incident on the modulation portion MA. In other words, most of the second polarized light POL2 which is incident on the modulation element MD is transmitted with its polarization plane unchanged because it passes through the non-modulation portion NMA which does not modulate the light. Part of the second polarized light POL2, which is incident on the modulation element MD, enters the modulation portion MA, and is converted into the first polarized light POL1. As described above, the second polarized light POL2 made incident on the liquid crystal element LD passes through the modulation element MD by mostly being maintained as the second polarized light POL2. In short, emitted light, which is the light emitted from the light source unit 3, and transmitted light, which is the light that has transmitted through the modulation element MD include the first polarized light POL1 and the second polarized light POL2. However, the ratio of the first polarized light POL1 in the light transmitted through the modulation element MD is smaller than the ratio of the first polarized light POL1 in the light emitted from the light source unit 3. Meanwhile, the ratio of the second polarized light POL2 in the light transmitted through the modulation element MD is larger than the ratio of the second polarized light POL2 in the light emitted from the light source unit 3.

According to such an illumination device 2, regardless of a direction of polarization of light incident on the liquid crystal element LD, the polarization directions of light which have transmitted through the modulation element MD can be made substantially uniform. That is, in the illumination device 2, when natural light having random oscillation planes enters the liquid crystal element LD and the modulation element MD, a predetermined polarization component (second polarized light) can be increased without having part of the polarization component (first polarized light) being absorbed, whereby the efficiency of use of light can be improved. When the display panel 1 is a liquid crystal display panel, light whose polarization directions are uniform is suitable for the illumination light of the display panel 1.

A first control example related to the liquid crystal element LD in the above-described illumination device 2 will be explained. The illumination controller ICT controls the liquid crystal element LD, and forms the lens 5 such that the light from the light source unit 3 is converged to the modulation portion MA. As described above, as the illumination controller ICT controls the voltage applied to the first control electrode E1 and the second control electrode E2, the lens 5 of a desired shape can be formed, and the convergence position of the incident light can be controlled freely. In other words, the illumination controller ICT controls the voltage applied to the first control electrode E1 and the second control electrode E2 in order to form the lens 5 of a desired shape whereby the modulation portion MA corresponds to the convergence position. By the above control, even if the positions of the modulation portion MA and the non-modulation portion NMA are fixed, the convergence position of the incident light obtained by the lens 5 can be matched with the position of the modulation portion MA.

Next, a second control example related to the modulation element MD will be described. The illumination controller ICT controls the modulation element MD, and forms the modulation portion MA at a position where the light from the light source unit 3 is converged by the lens 5. As described above, as the illumination controller ICT controls the voltage applied to the third control electrode E3 and the fourth control electrode E4, the modulation portion MA and the non-modulation portion NMA can be formed at desired positions. In other words, the illumination controller ICT controls the voltage applied to the third control electrode E3 and the fourth control electrode E4 such that the modulation portion MA is formed at the convergence position of the incident light obtained by the lens 5. By the above control, even if the shape of the lens 5 is fixed, the convergence position of the incident light obtained by the lens 5 can be matched with the position of the modulation portion MA.

According to the first control example and the second control example described above, of the light incident on the liquid crystal element LD, mainly the first polarized light POL1 can be converged to the modulation portion MA, and the polarization directions of light which have passed through the modulation element MD can be made substantially uniform.

Further, the first control example and the second control example may be combined. When the liquid crystal element LD and the modulation element MD are fixed, even if the modulation element MD is displaced relative to the liquid crystal element LD in the first direction X, by applying at least one of the first control example and the second control example, a displacement of the convergence position along the first direction X can be corrected. Also, even if variations in the interval between the liquid crystal element LD and the modulation element MD in the third direction Z are exhibited, by applying the first control example, variations in the focusing distance of the lens 5 along the third direction Z can be corrected.

Next, a configuration example of the display panel 1 will be explained.

Figure 9:
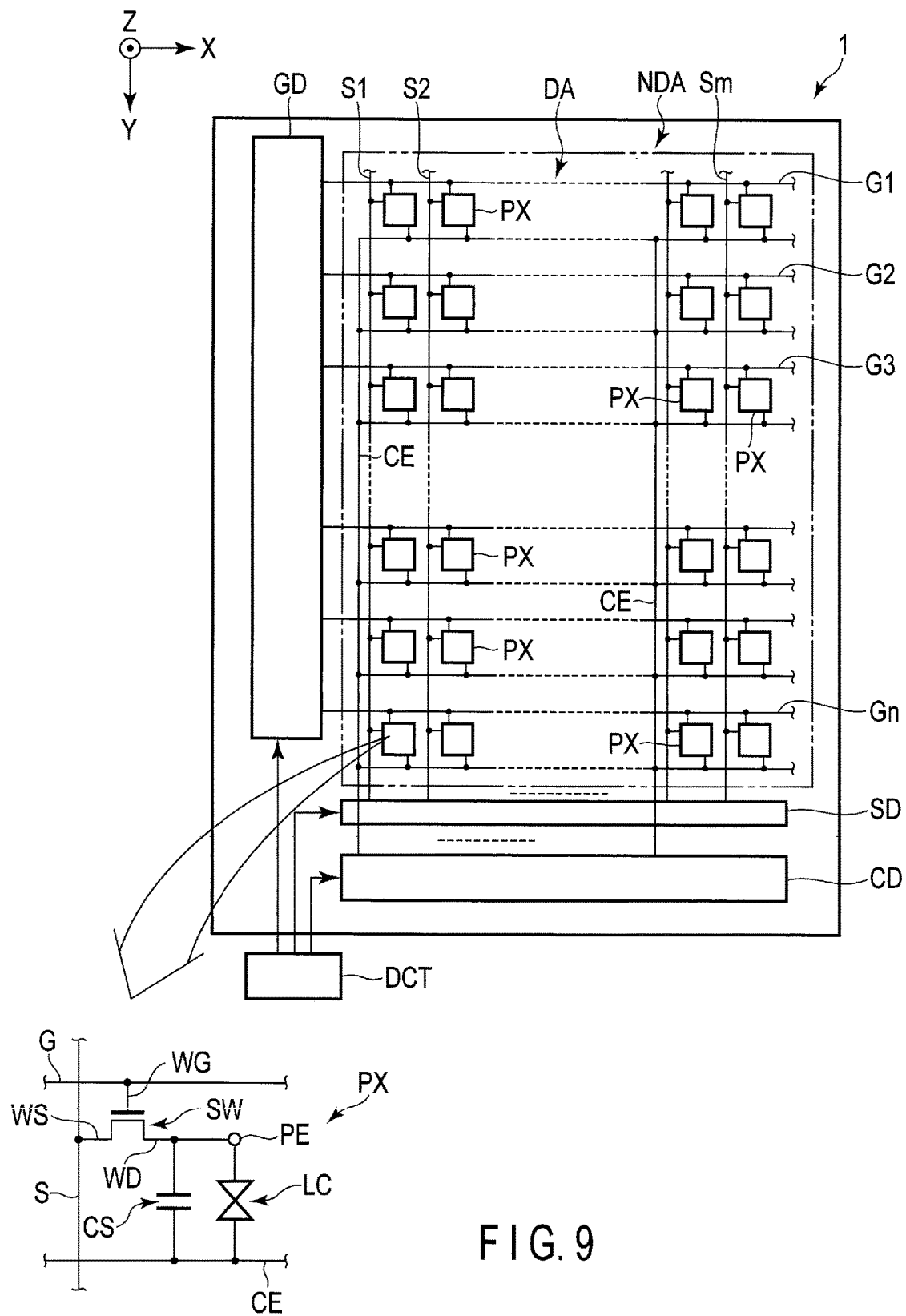
FIG. 9 is an illustration showing a basic structure and an equivalent circuit of a display panel 1.

FIG. 9 is an illustration showing a basic structure and an equivalent circuit of the display panel 1.

The display panel 1 includes a display area DA in which an image is displayed, and a non-display area NDA which surrounds the display area DA. The display area DA comprises a plurality of pixels PX. Here, the pixel indicates a minimum unit which can be individually controlled in accordance with a pixel signal, and exists in, for example, an area including a switching element arranged at a position where a scanning line and a signal line, which will be described later, cross each other. The pixels PX are arrayed in a matrix in the first direction X and the second direction Y. Also, the display panel 1 includes scanning lines (also referred to as gate lines) G (G1 to Gn), signal lines (also referred to as data lines or source lines) S (S1 to Sm), a common electrode CE, etc., in the display area DA. The scanning lines G extend in the first direction X, and are arranged in the second direction Y. The signal lines S extend in the second direction Y, and are arranged in the first direction X. Note that the scanning lines G and the signal lines S do not necessarily extend linearly, but may be partially bent. The common electrode CE is disposed over the pixels PX. The scanning lines G are connected to a scanning line drive circuit GD, the signal lines S are connected to a signal line drive circuit SD, and the common electrode CE is connected to a common electrode drive circuit CD. The scanning line drive circuit GD, the signal line drive circuit SD, and the common electrode drive circuit CD are controlled by the display controller DCT.

Each of the pixels PX comprises a switching element SW, a pixel electrode PE, the common electrode CE, a third liquid crystal layer LC, and the like. The switching element SW is constituted by a thin-film transistor (TFT), for example, and is electrically connected to the scanning line G and the signal line S. More specifically, the switching element SW includes a gate electrode WG, a source electrode WS, and a drain electrode WD. The gate electrode WG is electrically connected to the scanning line G. In the example illustrated, the electrode electrically connected to the signal line S is referred to as the source electrode WS, and the electrode electrically connected to the pixel electrode PE is referred to as the drain electrode WD. The scanning line G is connected to the switching elements SW of the respective pixels PX arranged in the first direction X. The signal line S is connected to the switching elements SW of the respective pixels PX arranged in the second direction Y.

The pixel electrode PE is electrically connected to the switching element SW. The common electrode CE is opposed to a plurality of pixel electrodes PE. The pixel electrode PE and the common electrode CE function as a first display electrode and a second display electrode which apply a voltage to the third liquid crystal layer LC. The pixel electrode PE and the common electrode CE are formed of a transparent conductive material such as ITO or IZO. A storage capacitance CS is formed between, for example, the common electrode CE and the pixel electrode PE.

Although the details of the structure of the display panel 1 will not be described here, the display panel 1 has a structure corresponding to one of various modes including a twisted nematic (TN) mode, a polymer dispersed liquid crystal (PDLC) mode, an optically compensated bend (OCB) mode, an electrically controlled birefringence (ECB) mode, a vertically aligned (VA) mode, a fringe field switching (FFS) mode, and in-plane switching (IPS) mode. Also, while explanation has been provided for a case where each of the pixels PX is driven by an active method, the pixels PX may be driven by a passive method.

Figure 10:
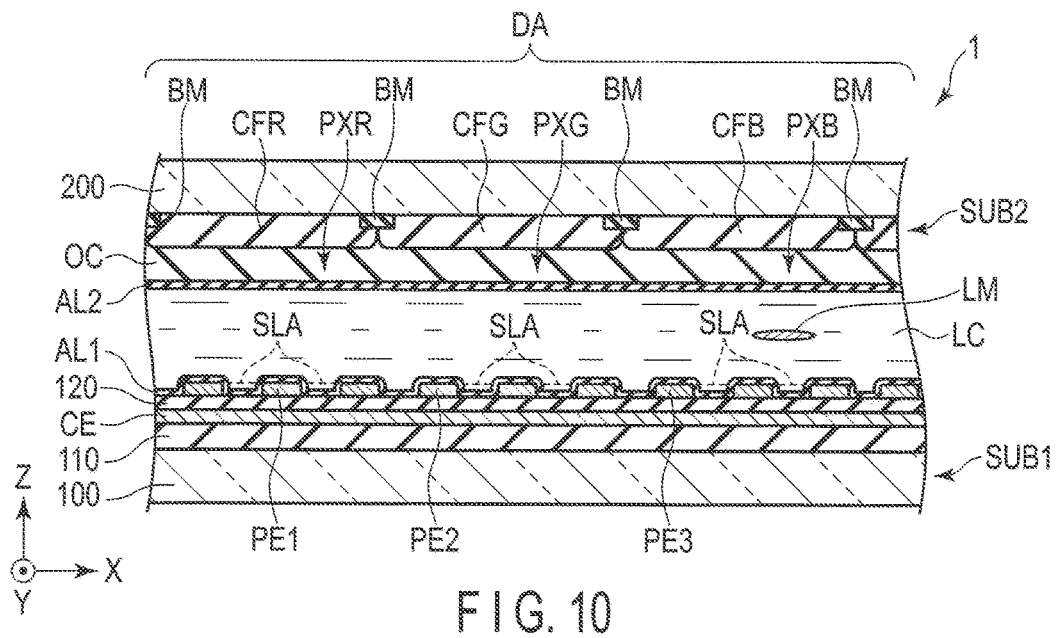
FIG. 10 is a cross-sectional view showing a configuration example of the display panel 1 shown in FIG. 9.

FIG. 10 is a cross-sectional view showing a configuration example of the display panel 1 shown in FIG. 9. Here, a cross-sectional structure of the display panel 1 adopting a fringe field switching (FFS) mode, which is one of display modes using a lateral electric field, will be explained briefly.

In the example illustrated, the display panel 1 includes a red pixel PXR which displays red, a green pixel PXG which displays green, and a blue pixel PXB which displays blue, in the display area DA. However, the display panel 1 may include a pixel which displays the other color. For example, from the standpoint of improving the transmissivity of the display panel 1, the display panel 1 should preferably include a pixel which displays white or a transparent pixel.

The display panel 1 comprises a fifth substrate SUB1, a sixth substrate SUB2, and the third liquid crystal layer LC. The fifth substrate SUB1 includes a first insulating substrate 100, a first insulating film 110, the common electrode CE, a second insulating film 120, pixel electrodes PE1 to PE3, a first alignment film AL1, and the like. The common electrode CE extends over the red pixel PXR, the green pixel PXG, and the blue pixel PXB. Each of the pixel electrode PE1 of the red pixel PXR, the pixel electrode PE2 of the green pixel PXG, and the pixel electrode PE3 of the blue pixel PXB is opposed to the common electrode CE, and includes slits SLA. In the example illustrated, the common electrode CE is located between the first insulating film 110 and the second insulating film 120, and the pixel electrodes PE1 to PE3 are located between the second insulating film 120 and the first alignment film AL1. Alternatively, the pixel electrodes PE1 to PE3 may be located between the first insulating film 110 and the second insulating film 120, and the common electrode CE may be located between the second insulating film 120 and the first alignment film AL1. In this case, the slits SLA are formed in the common electrode CE.

The sixth substrate SUB2 includes a second insulating substrate 200, a light-shielding layer BM, color filters CFR, CFG and CFB, an overcoat layer OC, a second alignment film AL2, and the like. The color filters CFR, CFG, and CFB are opposed to the pixel electrodes PE1 to PE3, respectively, with the third liquid crystal layer LC interposed therebetween. The color filter CFR is a red color filter, the color filter CFG is a green color filter, and the color filter CFB is a blue color filter. Note that, although the color filters CFR, CFG and CFB are formed in the sixth substrate SUB2 in the example illustrated, they may be formed in the fifth substrate SUB1. Although the light-shielding layer BM is located between adjacent color filters, it may be omitted in terms of improving the transmissivity of the display panel 1. If color display is unnecessary, the color filters are omitted.

The third liquid crystal layer LC is held between the fifth substrate SUB1 and the sixth substrate SUB2, and is sealed between the first alignment film AL1 and the second alignment film AL2. In one example, the thickness of the third liquid crystal layer LC is approximately 2 to 4 μm. Each of the first alignment film AL1 and the second alignment film AL2 is a horizontal alignment film.

In an off-state in which no electric field is produced between the pixel electrode PE and the common electrode CE, liquid crystal molecules LM included in the third liquid crystal layer LC are initially aligned in a direction substantially parallel to the X-Y plane by an alignment restriction force of the first alignment film AL1 and the second alignment film AL2. In an on-state in which an electric field is produced between the pixel electrode PE and the common electrode CE, the liquid crystal molecules LM are aligned in a direction different from the initial alignment direction, in the X-Y plane.

Next, an example of the display device DSP will be explained.

Figure 11:
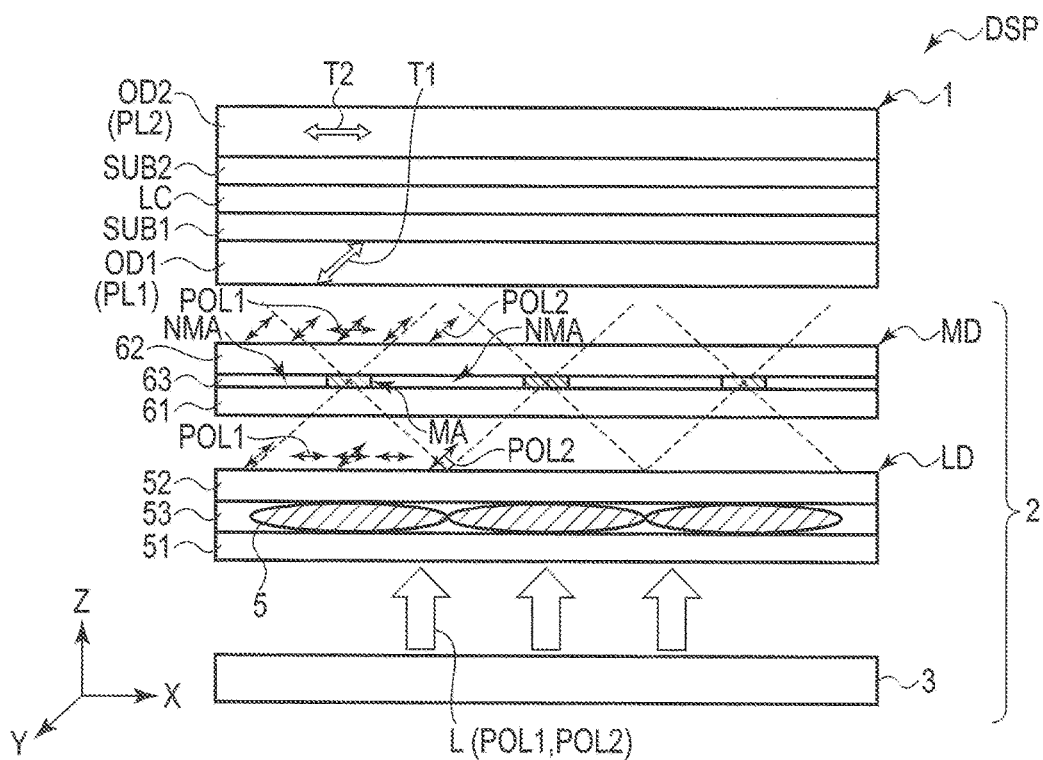
FIG. 11 is an illustration showing a first example of the display device DSP.

FIG. 11 is an illustration showing a first example of the display device DSP. More specifically, the display device DSP comprises the display panel 1 and the illumination device 2. The illumination device 2 comprises the light source unit 3, the liquid crystal element LD capable of forming the lens 5, and the modulation element MD capable of forming the modulation portion MA and the non-modulation portion NMA. The structure of the liquid crystal element LD is as described referring to FIGS. 2 to 5. The structure of the modulation element MD is as described referring to FIGS. 6 and 7. The structure of the display panel 1 is as described referring to FIGS. 9 and 10. The display panel 1 further comprises optical elements OD1 and OD2. The optical element OD1 includes a polarizer PL1, and the polarizer PL1 includes a transmission axis T1 which transmits the second polarized light POL2. The optical element OD1 is provided on the fifth substrate SUB1. The optical element OD1 may be in contact with the modulation element MD. The optical element OD2 includes a polarizer PL2, and the polarizer PL2 includes a transmission axis T2 which transmits the first polarized light POL1. The optical element OD2 corresponds to a first optical element which transmits the first polarized light POL1. The optical element OD1 corresponds to a second optical element which transmits the second polarized light POL2.

The light source unit 3 should preferably emit parallel light, which is the light parallel along the third direction Z. The light L emitted from the light source unit 3 includes the first polarized light POL1 and the second polarized light POL2. The light L first enters the liquid crystal element LD. The lens 5 provided in the liquid crystal element LD has the function of refracting the first polarized light POL1, as has been explained referring to FIG. 8. Accordingly, of the light incident on the liquid crystal element LD, while the first polarized light POL is converged, the second polarized light POL2 is not converged. The first polarized light POL1, which has passed through the liquid crystal element LD, is converted into the second polarized light POL2 after being converged to the modulation portion MA. Of beams of the second polarized light POL2 which have passed through the liquid crystal element LD, a beam of the second polarized light POL2 which has passed through the non-modulation portion NMA is maintained as the second polarized light POL2, and a beam of the second polarized light POL2 which has passed through the modulation portion MA is converted into the first polarized light POL1. Most of the light which has passed through the modulation element MD is the second polarized light POL2. The second polarized light POL2 made incident on the display panel 1 is transmitted mostly without being absorbed by the optical element OD1. The second polarized light POL2 which entered the third liquid crystal layer LC is selectively transmitted through the optical element OD2. In this way, an image is displayed. Note that the first polarized light POL1 which has passed through the modulation element MD is absorbed by the optical element OD1, and does not contribute to display.

According to the above-described display device DSP, the illumination device 2 converts the first polarized light POL1 into the second polarized light POL2, of the light emitted from the light source unit 3, and transmits most of the second polarized light POL2. Since the optical element OD1 includes the transmission axis T1 which transmits the second polarized light POL2, the display panel 1 is illuminated by the second polarized light POL2 which has passed through the optical element OD1. Accordingly, of the light which enters the display device DSP, a component (the second polarized light POL2) which passes through the optical element OD1 can be increased. As a result, the efficiency of use of light can be improved. Also, light which illuminates the display panel 1 is increased, and the transmissivity of the display panel 1 can be improved. Further, since the efficiency of use of light can be improved, not only can the power consumption of the illumination device 2 be improved, but the number of light sources can also be reduced.

FIG. 12 is an illustration showing a second example of the display device DSP. The second example shown in FIG. 12 is different from the first example shown in FIG. 11 in that the modulation element MD is constituted by a retardation film partially having a retardation. Such a modulation element MD may be bonded to the second substrate 52, or bonded to the optical element OD1. Alternatively, in the modulation element MD, only the modulation portion MA may be formed on an upper surface 52T of the second substrate 52, or only the modulation portion MA may be formed on a lower surface ODB of the optical element OD1. Also in the display device DSP as described above, advantages similar to those of the first example can be obtained. In addition, since the thickness of the modulation element MD is reduced, the display device DSP can be made slim.

FIG. 13 is an illustration showing a third example of the display device DSP. The third example shown in FIG. 13 is different from the second example shown in FIG. 12 in that the liquid crystal element LD is constituted by a retardation lens film. The retardation lens film can be obtained by, for example, curing a liquid crystal material in a predetermined alignment state. The lens 5 formed in such a retardation lens film exhibits a convergence function on the first polarized light POL1, likewise the lens 5 explained with reference to FIG. 5, for example, but hardly exhibits the convergence function on the second polarized light POL2. Such a liquid crystal element LD may be bonded to the light source unit 3, or bonded to the modulation element MD.

Also in the display device DSP as described above, advantages similar to those of the second example can be obtained. In addition, since the thickness of the liquid crystal element LD is reduced, the display device DSP can further be made slim.

FIG. 14 is an illustration showing a fourth example of the display device DSP. The fourth example shown in FIG. 14 is different from the first example shown in FIG. 11 in that the liquid crystal element LD is constituted by a retardation lens film. Such a liquid crystal element LD may be bonded to the light source unit 3, or bonded to the third substrate 61.

Also in the display device DSP as described above, advantages similar to those of the first example can be obtained. In addition, since the thickness of the liquid crystal element LD is reduced, the display device DSP can be made slim.

FIG. 15 is an illustration showing a fifth example of the display device DSP. The fifth example shown in FIG. 15 is different from the first example shown in FIG. 11 in that the display panel 1 does not comprise the optical element OD1, but comprises a non-transmission portion NTA at a position overlapping the modulation portion MA, and a transmission portion TA at a position overlapping the non-modulation portion NMA. In one example, the modulation element MD is bonded to the fifth substrate SUB1. In other words, the modulation element MD is directly bonded to the first insulating substrate 100 of the fifth substrate SUB1 shown in FIG. 10 with no intervening optical element such as a polarizer.

The non-transmission portion NTA corresponds to a portion formed by a non-light-transmissive material. For example, the non-transmission portion NTA corresponds to a portion where a wiring portion including the scanning line G, the signal line S, and the switching element SW in the fifth substrate SUB1 is arranged, or a portion where the light-shielding layer BM in the sixth substrate SUB2 is arranged.

As illustrated in the drawing, although the light which has passed through the modulation element MD is mostly the second polarized light POL2, it slightly includes the first polarized light POL1. In the case of the present example in which an optical element between the fifth substrate SUB1 and the modulation element MD is omitted, not only the second polarized light POL2, but also the first polarized light POL1 enters the fifth substrate SUB1. However, since the non-transmission portion NTA is arranged at a position where it overlaps the modulation portion MA which transmits the first polarized light POL1, the first polarized light POL1 does not contribute to display. Accordingly, the degradation in display quality, which is caused by mixture of the first polarized light POL1 and the second polarized light POL2, can be suppressed.

FIG. 16 is a plan view showing an example of the positional relationship of the modulation portion MA and the non-modulation portion NMA with the non-transmission portion NTA and the transmission portion TA shown in FIG. 15.

The light-shielding layer BM overlaps each of the scanning lines G1 and G2 extending in the first direction X, and the signal lines S1 and S2 extending in the second direction Y as seen in plan view. The transmission portion TA corresponds to an interior region surrounded by the light-shielding layer BM, or more specifically, a region indicated by downward-sloping hatch lines in the drawing. The pixel electrode PE is arranged in the transmission portion TA. In the example illustrated, the non-transmission portions NTA correspond to regions overlapping first portions BMX extending in the first direction X of the light-shielding layer BM, or regions overlapping the scanning lines G1 and G2.

Each of the modulation portion MA and the non-modulation portion NMA extends in the first direction X. The modulation portions MA overlap the first portions BMX of the light-shielding layer BM or the scanning lines G1 and G2, respectively, as seen in plan view. The non-modulation portion NMA overlaps the transmission portion TA. Accordingly, the first polarized light POL1 which have passed through the modulation portion MA are blocked by the first portions BMX or the scanning lines G1 and G2. Accordingly, it is possible to suppress reduction in the contrast ratio caused by the first polarized light POL1 passing through the display panel 1.

Figure 17:
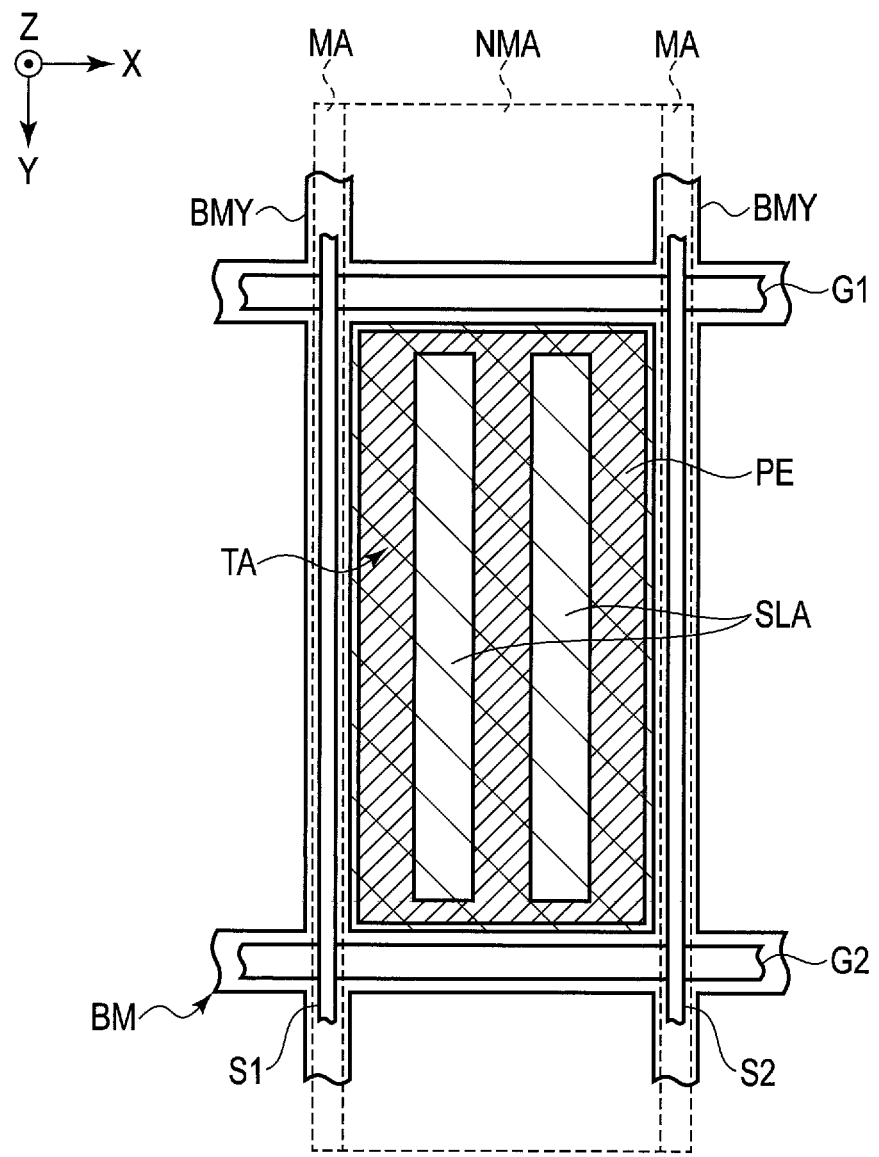
FIG. 17 is a plan view showing another example of the positional relationship of the modulation portion MA and the non-modulation portion NMA with the non-transmission portion NTA and the transmission portion TA shown in FIG. 15.

FIG. 17 is a plan view showing another example of the positional relationship of the modulation portion MA and the non-modulation portion NMA with the non-transmission portion NTA and the transmission portion TA shown in FIG. 15. In the example illustrated, the non-transmission portion NTA corresponds to regions overlapping second portions BMY extending in the second direction Y of the light-shielding layer BM, or regions overlapping the signal lines S1 and S2.

Each of the modulation portion MA and the non-modulation portion NMA extends in the second direction Y. The modulation portions MA overlap the second portions BMY of the light-shielding layer BM or the signal lines S1 and S2 as seen in plan view. The non-modulation portion NMA overlaps the transmission portion TA. Accordingly, the first polarized light POL1 which have passed through the modulation portions MA are blocked by the second portions BMY or the signal lines S1 and S2. Accordingly, it is possible to suppress reduction in the contrast ratio caused by the first polarized light POL1 passing through the display panel 1.

Also in the display device DSP of the fifth example as described above, advantages similar to those of the first example can be obtained. In addition, since the thickness of the display panel 1 is reduced, the display device DSP can be made slim. In structuring the fifth example, the modulation element MD formed of a retardation film as has been explained in the second example may be combined, or the liquid crystal element LD formed of the retardation lens film as has been explained in the third example may be combined.

As explained above, according to the present embodiment, an illumination device and a display device capable of improving the efficiency of use of light can be provided.

The present invention is not limited to the embodiments described above but the constituent elements of the invention can be modified in various manners without departing from the spirit and scope of the invention. Various aspects of the invention can also be extracted from any appropriate combination of a plurality of constituent elements disclosed in the embodiments. Some constituent elements may be deleted in all of the constituent elements disclosed in the embodiments. The constituent elements described in different embodiments may be combined arbitrarily.

What is claimed is:

1. An illumination device comprising:
a light source unit which emits light;
a modulation element comprising a modulation portion which modulates incident light, and a non-modulation portion which is adjacent to the modulation portion; and
a liquid crystal element located between the light source unit and the modulation element, the liquid crystal element forming a lens between the light source unit and the modulation portion,
wherein the modulation portion is smaller than the non-modulation portion,
the modulation element comprises a third substrate comprising a plurality of third control electrodes, a fourth substrate comprising a fourth control electrode, and a second liquid crystal layer held between the third substrate and the fourth substrate,
the second liquid crystal layer includes liquid crystal molecules twisted-aligned in a state where no electric field is formed between the third control electrodes and the fourth control electrode,
the liquid crystal molecules in the non-modulation portion are vertically aligned by the electric field,
the liquid crystal molecules in the modulation portion are twisted-aligned, and
the modulation portion is arranged at a position where light is converged by the lens.

2. The illumination device of claim 1, further comprising a controller which controls the liquid crystal element, wherein
the liquid crystal element comprises a first substrate comprising a plurality of first control electrodes, a second substrate comprising a second control electrode, and a first liquid crystal layer held between the first substrate and the second substrate, and
the controller controls a voltage to be applied to the first liquid crystal layer for forming the lens which is opposed to the modulation portion in the first liquid crystal layer.

3. The illumination device of claim 2, wherein:
each of the first control electrodes is a strip electrode; and
the modulation portion is located between two first control electrodes.

4. The illumination device of claim 1, further comprising a controller which controls the modulation element, wherein
the controller controls a voltage to be applied to the second liquid crystal layer for forming the modulation portion and the non-modulation portion in the second liquid crystal layer.

5. The illumination device of claim 1, wherein:
a polarizer is nonexistent between the light source unit and the liquid crystal element; and
a polarizer is nonexistent between the liquid crystal element and the modulation element.

6. The illumination device of claim 5, wherein:
emitted light which is emitted from the light source unit, and transmitted light which is transmitted through the modulation element, include first polarized light and second polarized light, respectively;
a ratio of the first polarized light in the transmitted light is smaller than a ratio of the first polarized light in the emitted light; and
a ratio of the second polarized light in the transmitted light is larger than a ratio of the second polarized light in the emitted light.

7. A display device comprising:
a display panel; and
an illumination device which illuminates the display panel, wherein
the illumination device comprises:
a light source unit which emits light toward the display panel;
a modulation element located between the light source unit and the display panel, the modulation element comprising a modulation portion which modulates incident light, and a non-modulation portion which is adjacent to the modulation portion; and
a liquid crystal element located between the light source unit and the modulation element, the liquid crystal element forming a lens between the light source unit and the modulation portion, wherein
the modulation portion is smaller than the non-modulation portion,
the modulation element comprises a third substrate comprising a plurality of third control electrodes, a fourth substrate comprising a fourth control electrode, and a second liquid crystal layer held between the third substrate and the fourth substrate,
the second liquid crystal layer includes liquid crystal molecules twisted-aligned in a state where no electric field is formed between the third control electrodes and the fourth control electrode,
the liquid crystal molecules in the non-modulation portion are vertically aligned by the electric field,
the liquid crystal molecules in the modulation portion are twisted-aligned, and
the modulation portion is arranged at a position where light is converged by the lens.

8. The display device of claim 7, further comprising a controller which controls the liquid crystal element, wherein
the liquid crystal element comprises a first substrate comprising a plurality of first control electrodes, a second substrate comprising a second control electrode, and a first liquid crystal layer held between the first substrate and the second substrate, and the controller controls a voltage to be applied to the first liquid crystal layer for forming the lens which is opposed to the modulation portion in the first liquid crystal layer.

9. The display device of claim 8, wherein:
each of the first control electrodes is a strip electrode; and
the modulation portion is located between two first control electrodes.

10. The display device of claim 7, further comprising a controller which controls the modulation element, wherein the controller controls a voltage to be applied to the second liquid crystal layer for forming the modulation portion and the non-modulation portion in the second liquid crystal layer.

11. The display device of claim 7, wherein:
a polarizer is nonexistent between the light source unit and the liquid crystal element; and
a polarizer is nonexistent between the liquid crystal element and the modulation element.

12. The display device of claim 11, wherein:
emitted light which is emitted from the light source unit, and transmitted light which is transmitted through the modulation element, include first polarized light and second polarized light, respectively;
a ratio of the first polarized light in the transmitted light is smaller than a ratio of the first polarized light in the emitted light; and
a ratio of the second polarized light in the transmitted light is larger than a ratio of the second polarized light in the emitted light.

13. The display device of claim 7, wherein the display panel includes a fifth substrate opposed to the illumination device, a sixth substrate, a third liquid crystal layer held between the fifth substrate and the sixth substrate, a pixel electrode and a common electrode which apply a voltage to the third liquid crystal layer, and a first optical element which is provided on the sixth substrate and transmits first polarized light.

14. The display device of claim 13, further comprising a second optical element which is provided on the fifth substrate, and transmits second polarized light intersecting the first polarized light.

15. The display device of claim 7, wherein the display panel includes a non-transmission portion overlapping the modulation portion, and a transmission portion overlapping the non-modulation portion.

* * * * *